United States Patent [19]

McGee et al.

[11] Patent Number: 5,528,566

[45] Date of Patent: Jun. 18, 1996

[54] APPARATUS FOR OPTICAL DISC STORAGE OF OPTICAL DISCS AND SELECTIVE ACCESS AND/OR RETRIEVAL THEREOF VIA PNEUMATIC CONTROL

[76] Inventors: Michael D. McGee, 15041 Sobey Rd., Saratoga, Calif. 95070; Scott T. Luan, P.O. Box 11185, Stanford, Calif. 94309

[21] Appl. No.: 148,003

[22] Filed: Nov. 5, 1993

[51] Int. Cl.$^6$ ............................................. G11B 17/24
[52] U.S. Cl. ........................... 369/37; 369/191; 221/278
[58] Field of Search .................................. 414/277, 280, 414/795.5, 676; 221/278; 209/906; 222/400.7; 406/139, 142, 146; 369/34, 36, 37, 38, 39, 178, 191–194

[56] References Cited

U.S. PATENT DOCUMENTS

| | | | |
|---|---|---|---|
| 3,040,727 | 6/1962 | Edwards et al. | 221/278 |
| 3,174,645 | 3/1965 | Barcia et al. | 221/278 |
| 4,034,869 | 7/1977 | Stange et al. | 214/16.4 R |
| 4,050,751 | 9/1977 | Stange | 312/197 |
| 4,099,810 | 7/1978 | Stange | 312/183 |
| 4,539,663 | 9/1985 | Ishibashi et al. | 369/34 |
| 4,984,228 | 1/1991 | Agostini | 369/37 |
| 5,027,335 | 6/1991 | Deis | 369/37 |
| 5,187,695 | 2/1993 | Schindler et al. | 369/37 |

Primary Examiner—Stuart S. Levy
Assistant Examiner—William J. Klimowicz
Attorney, Agent, or Firm—Ronald C. Fish

[57] ABSTRACT

A mass memory storage system, capable of recording and/or playing back optical discs in any optical disc format. The system contains a plurality of optical discs arranged in a vertical array in the shape of a doughnut with no hole in the middle, each disc being stored in a separate radially oriented track. The system employs a central disc transport mechanism comprised of a plurality of read-head modules each of which is capable of picking up and reading data from or writing data to any optical disc in the system. The read-head modules are mounted on a central bi-directionally rotating platform driven by a stepper motor through a gear assembly. Each track contains one sunken area to store an optical disc and one sunken area from which the optical disc may be picked up by a read-head module. The stepper motor and the read-head modules are under control of a microprocessor. By a motor step-incremental disc location ratio, positional accuracy for alignment of an available read-head module with a track containing a disc to be accessed may be achieved. Discs are moved from the storage area of each track to the pick up area by a pneumatic system which selectively pressurizes a pneumatic channel in the rotating platform and in the selected track.

12 Claims, 14 Drawing Sheets

Figure 4B
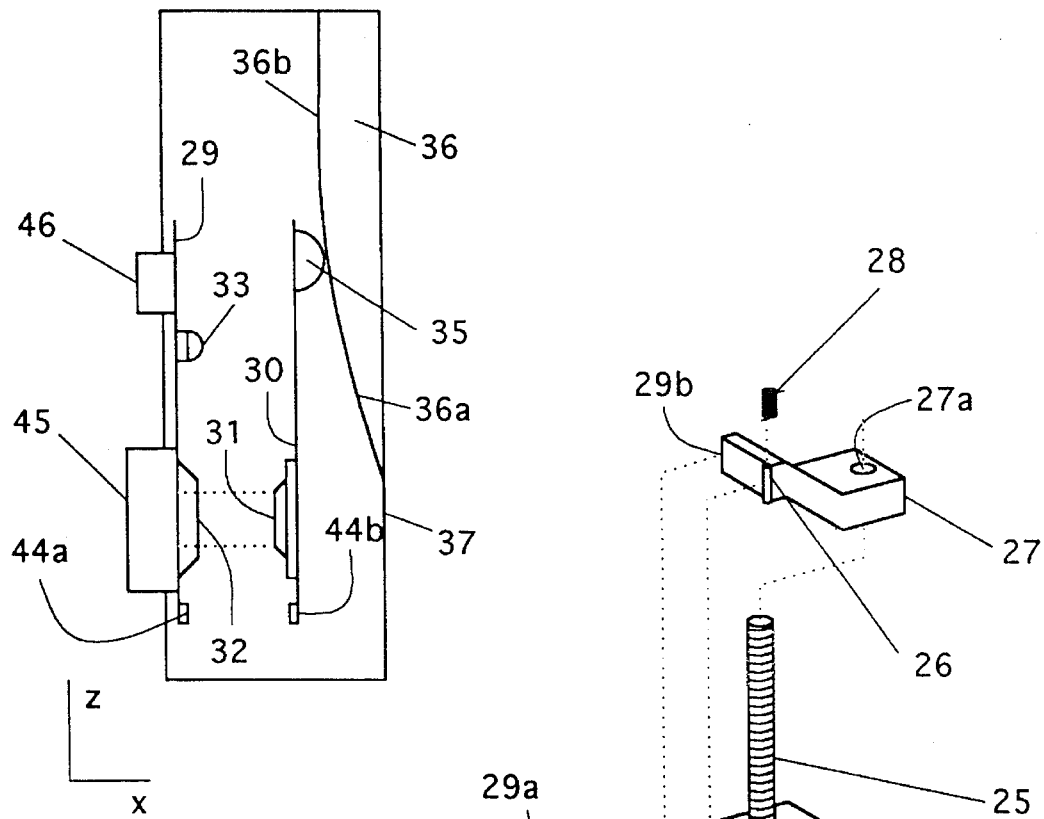
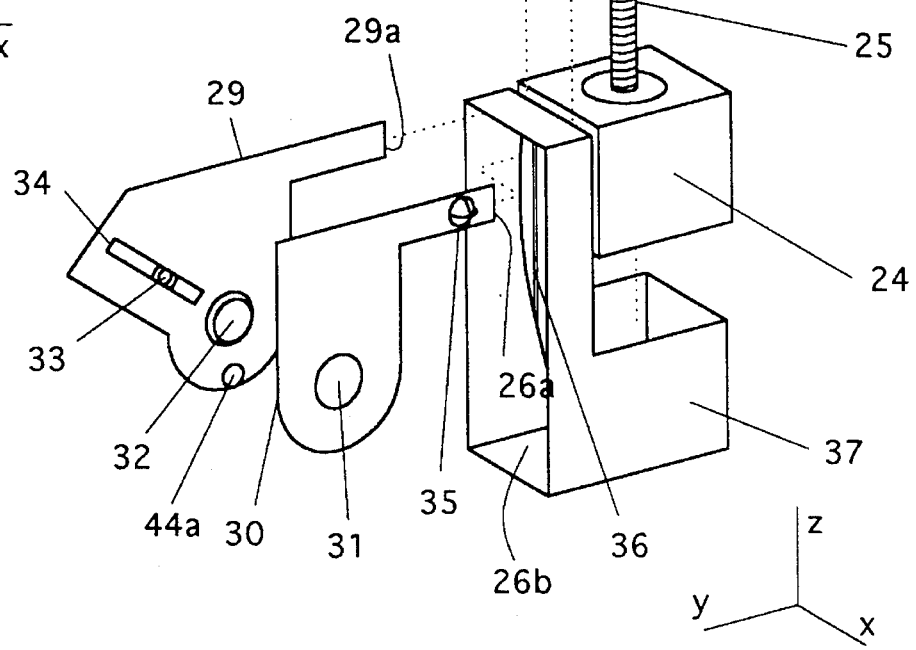
Figure 4A

Figure 9A
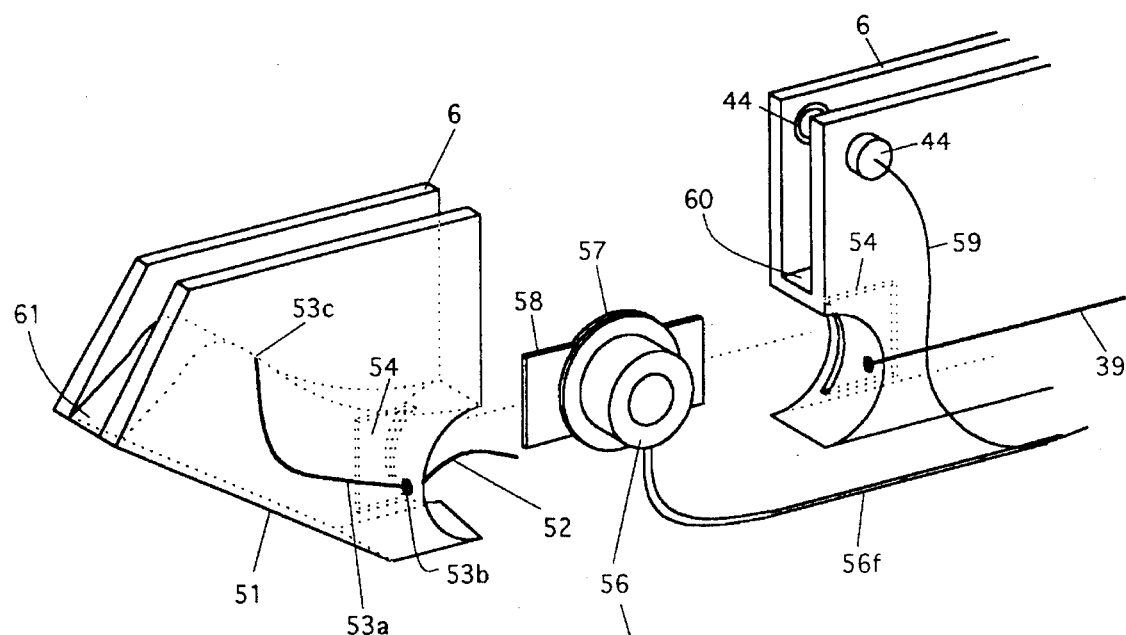
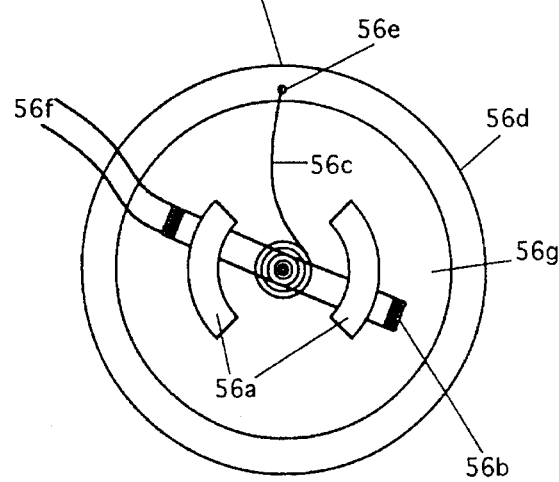
Figure 9B

APPARATUS FOR OPTICAL DISC STORAGE OF OPTICAL DISCS AND SELECTIVE ACCESS AND/OR RETRIEVAL THEREOF VIA PNEUMATIC CONTROL

BACKGROUND OF THE INVENTION

1. Field of the Invention

The present invention relates to the field of modular storage and transport mechanisms for storage of many CDs: CD-ROM; CD-I; CD-ROM XA; MMCD; KODAK PHOTO CD; VIDEO DISCs (to be named from this point on known as Multi Session) and selective data access and/or recording of a plurality of discs simultaneously.

2. Background and the Prior Art

As the volume of data grows exponentially in the business world with the introduction of huge on-line databases, electronic document storage, fiber optic subscriber links, multimedia presentation software, multi-tasking machines running complex programs in multiple windows, a need has arisen for mass storage devices which can store multiple megabytes of data with fast access time.

In addition, the music CD has enjoyed ever increasing popularity since its invention in 1982. Consumers have developed large collections of CDs and a need has developed for a means to store them and play them back into a music system.

Likewise, the CD-ROM mass data storage media for computers has also started to increase in popularity and is expected to increase in popularity as a teaching and management of mass information media using complex graphic and video presentations, which, by virtue of the need for storage of huge quantities of data, virtually require CD-ROM storage media.

Optical read-write discs are rising in popularity because of the capacity to store vast quantities of data. Video discs are also available as an alternative media to video tape, and some consumers have large collections thereof. In addition, software programs are becoming larger and larger, and it is expected that software manufacturers will with increasing regularity begin delivering their software on optical discs to save on media and mailing costs.

In more sophisticated systems such as networks where large quantities of data and programs are stored on distributed servers, it is expected that servers will eventually make use of read-write optical discs because of the increased data storage capacity thereof.

Because of this evolution of storage media, there has arisen a need for secure, large volume storage of these valuable optical discs, and a need for easy, nondestructive and automated access to selected ones thereof for playback for data retrieval/recording and data storage. Various systems exist in the prior art for storage and playback of music CDs and CD-ROMs. Examples of the types of prior art systems in existence now include:

CDworks family of machines (Model 1000) by Virtual Microsystems of San Mateo, Calif.: A CD-ROM based server for network applications. Apparently only a single CD-ROM is resident although the literature is unclear on this;

NSM HiFI Visions CD Player and Dual CD Magazine: Two 50 CD magazines with CDs stacked in vertical arrays with CDs horizontally oriented. A shuttle moves vertically to the selected CD and removes it with its protective tray and then delivers the CD to a player;

Sony CDK-3600 Auto Disc Loader: Handles storage, loading and playback of up to 360 compact discs. Dual CD players are built in. A computer may be connected to the unit via an RS-232 port for automated control of the playback process. Up to 28 units may be daisy chained to control up to 9,999 CDs. Disc access time is less than 2 seconds with disc loading time less than 15 seconds;

Boffin CD-ROM Mini Tower: A 4 bay CD-ROM tower with 4 CD-ROM drives. Used for large database operations.

Corel SCSI for Jukeboxes: Supports all WORM discs, which may be rewritten and multi-function optical disc jukeboxes by interfacing the jukebox with a network via a NetWare 386 file server thereby allowing the jukebox to be seen on the network through a standard Novell volume that has been defined on the file server's hard disc;

Denon DN-1200F 200 CD Changer: Access to 200 CDs with access time between discs of approximately 12 seconds. This unit can cascade up to 16 CD changers on a single serial port. Dual 100 disc magazines store 200 CDs in two linear arrays. Details of the transport system and player mechanism are unclear;

Sony 100 CD Disc Changer for music CDs: Up to 100 music CDs may be stored in a circular vertically oriented array. Details of the disc transport and player mechanisms are unclear. The CDs may be grouped into different categories electronically;

Fisher Studio 24 CD Management System: Stores and organizes up to 24 music CDs in a circular vertically oriented array. Two units can be connected in tandem to access up to 48 discs. Teaches a single vertical slot for loading of CDs;

U.S. Pat. No. 4,519,055, filed Apr. 19, 1983: Teaches a doughnut shaped cartridge storage module, a changer or transport mechanism and a record/read station. The storage modules is a carousel type with radially cartridge storage modules that can store up to 100 CDs. A changer mechanism resides in the center and rotates about a center axis, but has a different structure than taught in the invention;

U.S. Pat. No. 2,839,305 teaches a selective record changer with a carousel of vertically stored records with a central player and a transport mechanism which selects the record out of the array and moves it to the player.

3. The Problem with the Prior Art Approaches

None of the prior art approaches have as fast an access time as is possible. Generally speaking, the prior art approaches involve a transport mechanism with a geometry which requires the selected disc to move farther than is necessary in order to reach the playback position. Typically, the disc must be removed from the storage area to a playback position by the transport mechanism requiring several degrees of freedom in motion.

Another problem with the prior art is expansion. As collections of music CDs, CD-ROM discs and data storing optical read-write discs grow larger, prior art systems become too small and must be replaced by bigger, more expensive systems for storage and playback.

Prior art storage and transport mechanisms are generally limited to storage and playback of only one type of optical disc. Thus, a storage and playback mechanism for music CDs cannot retrieve data from CD-ROMs and supply it to a computer.

Therefore, a need has arisen for a storage and transport mechanism which can store large numbers of optical discs and which can adapt to an ever-growing collection size without being rendered obsolete. The system should enjoy fast access time and have the ability to store and playback any type of optical disc of the same general diameter regardless of the data type stored thereon. Further, the system should be capable of accessing a plurality of disc for simultaneous playback and/or recording.

BRIEF DESCRIPTION OF THE INVENTION

According to the teachings of the invention, there is disclosed herein a modular, circular storage carousel for optical discs. The carousel contains hundreds of radial tracks arranged on radial lines from the center of the circular carousel. Each track is shaped to have one storage area in which the optical disc assigned to that track rests under the influence of gravity during any time which that optical disc is not selected for playback or recording. Each track also contains a second sink to which the optical disc is moved when it is selected for playback. The optical discs remain in the vertical position during storage and playback/recording.

Transport of the optical disc between storage and playback positions is accomplished via a centralized pneumatic system which is coupled to a pressure channel molded or otherwise formed under or within each track and in the bi-directional rotation platform. When a disc is selected for playback, the central pneumatic system generates an impulse of air pressure which is directed through a selected one of four platform pressure channels formed in the rotatable platform.

The rotatable platform supports four read-head modules. To pick-up a disc for data access the rotatable platform will have been previously moved so as to put the outlet of the selected platform pressure channel in close proximity to the inlet of the pressure channel of the track associated with the selected disc. The airflow generated by the central pneumatic system is then directed into the inlet of the pressure channel of the track associated with the selected disc and exits through the channel outlet located in the storage sink of the track adjacent the edge of the selected disc. The disc is moved by the air pressure force on the disc generated by airflow out of the outlet location in the depression in the track designated as the storage sink (position one). This causes the disc to move into a second depression (position two) where the disc awaits pickup by one of four read-head modules mounted on the rotatable platform.

Each of the read-head modules corresponds to one of the platform pressure channels and is positioned on the platform in such a manner so that if the platform rotates to align its corresponding platform pressure channel with the channel of the selected track with the outlet and inlet of each respectively in close proximity, the arms of the read-head module will extend over the carousel so that the disc will be located between the arms when the disc arrives at the second depression (position two). An optical sensor located on the arms senses the presence of a disc in the pick-up sink and activates the pick-up mechanism.

Each of the four read-head modules incorporates a disc pick-up mechanism as described below: An arm-mount with a threaded hole rides up and down on the lead screw depending upon the turning direction of the lead screw. The lead screw is coupled to a DC-motor. Two arms, which are referred to as the male and female hub arms in the claims, are attached to the arm-mount. The female hub arm is attached directly to the arm-mount while the male hub arm is attached by a torsional-spring loaded hinge. The two hub arms include female and male hubs designed to engage each other through the center hole of an optical disc in a clamping action so the disc can be secured for spin during the playback/recording process. The male hub arm includes a cam follower called a cam contact hemisphere which is always in contact with the cam due to the spring action of the hinge. The cam surface is contoured so that the male hub arm pivots away from the female hub arm to disengage the hubs when the arms are lowered. The male hub arm pivots toward the female hub arm to engage the hubs when the arms are lifted.

When the optical sensor senses the presence of the disc between the arms, it activates the motor to turn the lead screw so that the arm-mount and the hub arms are lifted. When the disc is secured by the hubs and the disc has been lifted to the final position (position 3), a DC-motor coupled to the female hub then spins the disc at the proper speed for data retrieval or recording. Data is then read from the disc or recorded onto the disc by a laser diode which is actuated by a voice coil.

The selected disc is lifted clear of dividers between the tracks by the pick-up mechanism described above so that the platform can rotate freely. Because the selected disc(s) when in the playback position, does not interfere with rotational movements of the rotating platform, other discs can be accessed in the manner described above for simultaneous playback therefrom or recording thereto. Up to four discs may be picked up in this manner and have data simultaneously retrieved therefrom or recorded thereon.

Return of the disc in the storage sink (position 1) of its respective track is accomplished by reversing the process described above after each disc is realigned with its assigned track.

BRIEF DESCRIPTION OF THE DRAWINGS

FIGS. 1 through 11 illustrate an embodiment of the invention in which:

FIG. 1 illustrates a top view of the invention showing the carousel read-head modules and the rotating platform;

FIG. 2 illustrates a side view of the invention showing a diametrical cross-section of the carousel and the components that are located within the system;

FIG. 3 illustrates an exploded perspective view of the centrally located components including the rotating platform, the transport mechanism and the central pneumatic system;

FIG. 4A illustrates a front view of the read-head module including the cam follower apparatus of the transport mechanism;

FIG. 4B illustrates an exploded view of the read-head module showing the components of the disc pick-up mechanism;

FIG. 5 is a cross-sectional view of the rotating platform and base insert illustrating the wiring and central pneumatic tubing arrangement;

FIG. 8 is a diametrical cross-sectional view of a plurality of system illustrating the nested stack arrangement;

FIGS. 9A and 9B illustrate an exploded view of the optical disc entry/exit track and shows the components involved in the optical disc entry/exit track illustrating the optical disc entry/exit process;

FIG. 11 is a side view of the optical disc entry/exit track illustrating the optical disc exit process.

DETAILED DESCRIPTION OF A PREFERRED EMBODIMENT

Figure 1:
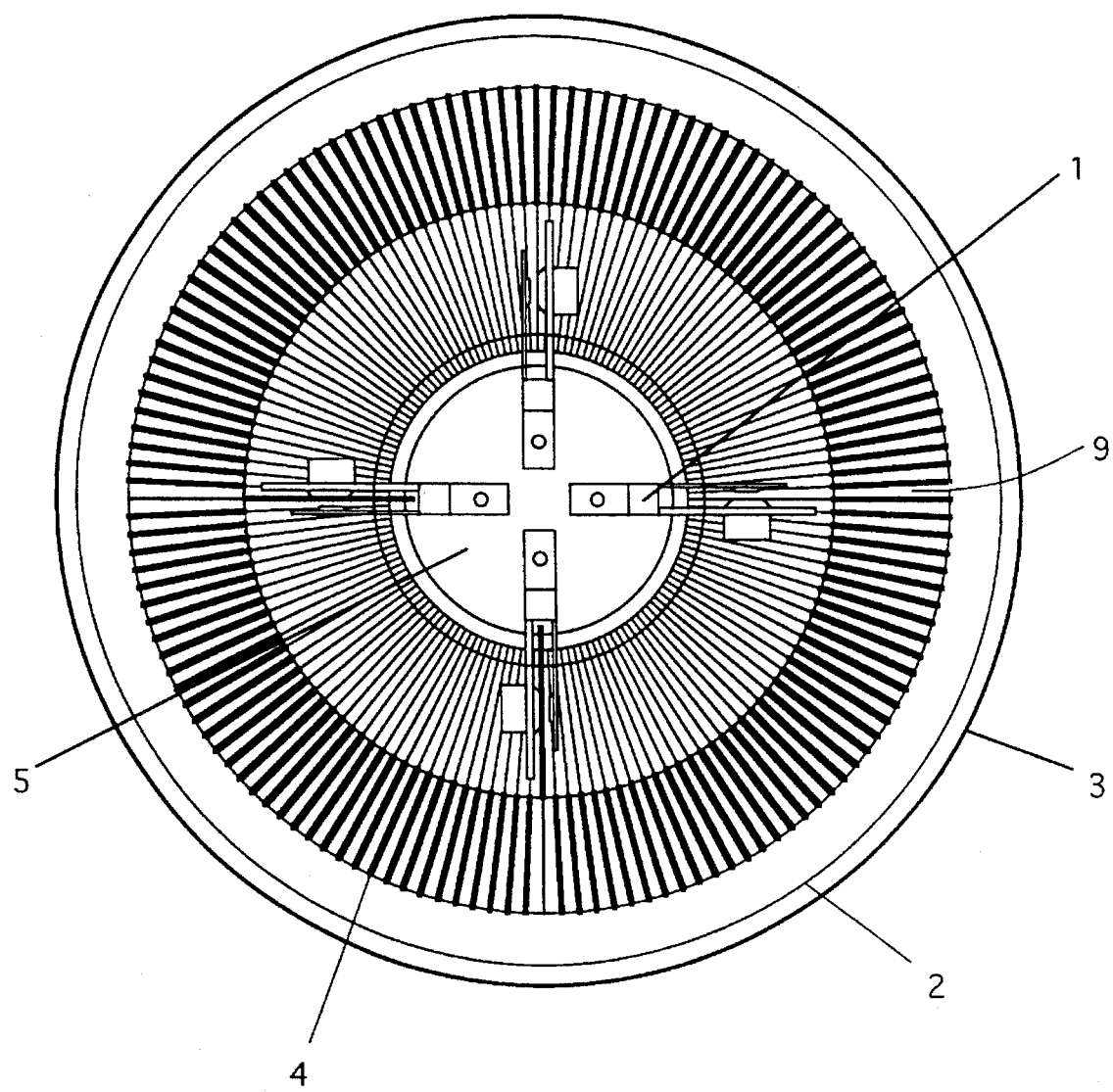

Referring to FIG. 1, there is shown a top view of the storage and playback carousel 2 for optical discs 4 according to the teachings of the invention. The carousel 2, shaped in the form of a torus, is enclosed in the system housing 3. Each track 9 serves to store one optical disc 4 in a vertical orientation and in radial alignment with respect to the carousel 2. The number of tracks is limited only by the diameter of the carousel 2. Carousels of different heights and diameters can be selected by the user to accommodate various sizes of optical discs from video discs down to mini discs or other smaller media to be developed in the future. Also, carousels of different diameters can be selected for various disc storage capabilities. Further, discs of any size can be stored in the same carousel 2. This will be discussed later.

In the center of the carousel 2, platform 5 serves as the foundational support and rotary actuator for four read-head modules 1 to be described below. The system includes four read-head modules each of which read-head module 1 is typical. Each of the read-head modules 1 includes a pick-up mechanism and appropriate components for disc 4 playback/recording (i.e.; laser-diode).

Figure 2:
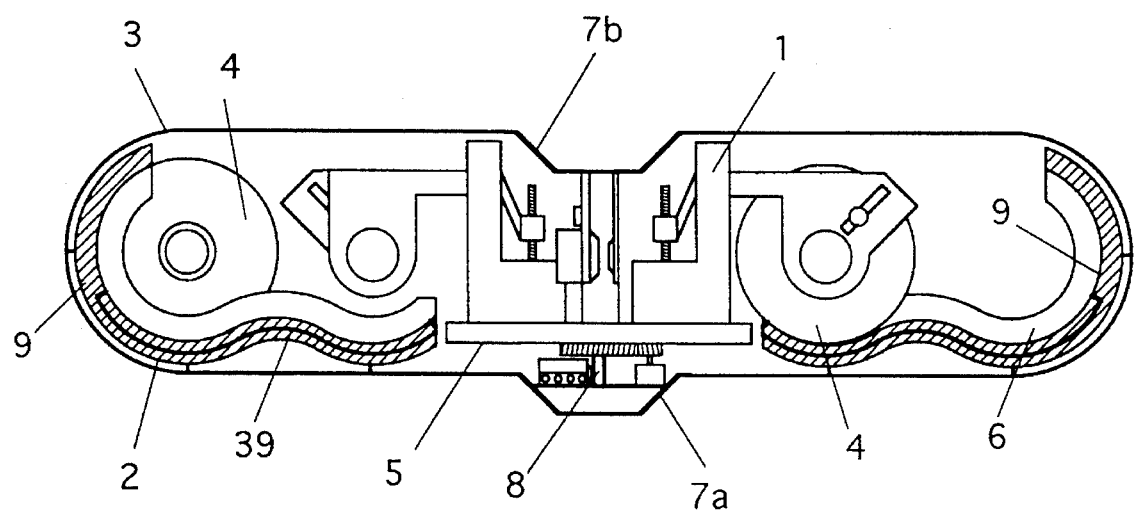

The system housing 3 has essentially flat top and bottom surfaces (shown in FIG. 2). In the center of the carousel 2, rotating platform 5 serves as the foundational support of the centrally located transport mechanism. The system housing 3 has affixed thereto a plurality of tracks of which track 9 is typical. The number of tracks is limited only by the diameter of the system housing 3. Each track 9 serves to store one optical disc 4 in a vertical orientation and aligned with a radial of the carousel 2.

Referring to FIG. 2, there is shown a cross-sectional view of the carousel 2 revealing the internal centrally located components. The discs 4 and their tracks 9 are separated by dividers 6. Each divider 6 is of substantial height to prevent unwanted play of the optical discs 4, i.e., to prevent the discs 4 from flopping back and forth within the system housing 3 when the system housing 3 is being transported. In the preferred embodiment, the degree of separation between consecutive dividers 6 is sufficient to allow the optical disc 4 to roll freely on the track 9 with minimal contact friction and without excessive deviation of the orientation of the disc 4 from vertical during the disc retrieval/return process to be described below and so forth.

In other embodiments, where alternative motive mechanisms which are more efficient than and can generate more air pressure force than the pneumatic system of the preferred embodiment to move the optical disc 4 from the storage sink (position one) to the pick-up sink (position two), the separation distance between two consecutive dividers 6 can be decreased so as to engage the optical discs 4 more firmly and to maximize disc storage capability.

Each track 9 has a curved shape with two depressions or sinks therein one of which serves as the storage sink (position one) and the other of which serves as a pick-up sink (position two). These sinks provide stable positions for disc storage and pick-up and prevent any unwanted movements of the optical disc 4 toward or away from the center of the carousel 2. An optical disc 4 is shown in the storage sink (position one) of track 9. An optical disc 4 is shown in the pick-up sink (position two) of track 9. In alternative embodiments, solenoid operated stops on a flat track could be used to stabilize the optical disc 4 in either the storage sink (position one) or the pick-up sink (position two). Each track 9 has integrally formed therein a track pressure channel 39. The purpose and functioning of this track pressure channel 39 will be explained further below.

The system housing 3 has essentially flat top and bottom surfaces with circular sides and is attached directly to the carousel 2 as shown in FIG. 2. The system housing 3 has affixed thereto a plurality of tracks of which track 9 is typical. The number of tracks is limited only by the diameter of the system housing 3. Each track 9 serves to store one optical disc 4 in a vertical orientation and aligned with a radial of the carousel 2.

Referring to FIG. 2, there is shown a cross-sectional view of the carousel 2 revealing the internal centrally located components.

Dividers 6 may, in some embodiments, be covered with felt or other soft nonabrasive substances which lightly engage the disc 4 on both sides thereof so as to make a cushioned, nonabrasive storage slot so as to protect the optical disc 4 from damage during vibration or transport. The degree of engagement between the dividers 6 and the optical disc 4 must be very light or nonexistent in embodiments using pneumatic force to move the optical discs 4 from a storage sink (position one) to a pick-up sink (position two) so as to not generate frictional forces which are great enough to overcome forces generated by a pneumatic burst of air used to roll the disc 4 from the storage sink (position one) to the pick-up sink (position two).

Figure 7A:
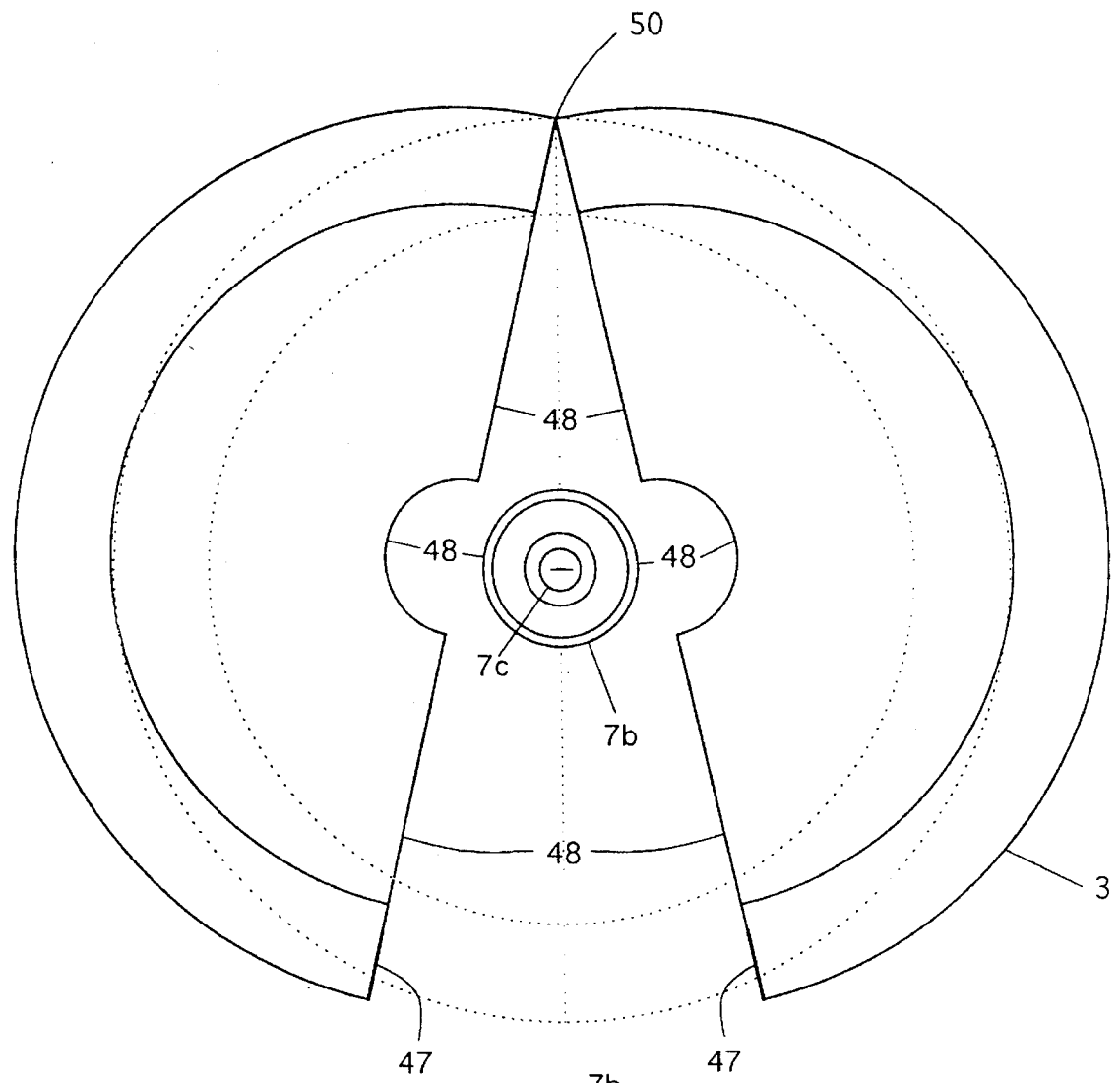
FIG. 7A is a top view of the carousel illustrating the clamshell structure for access to the internal mechanisms.
Figure 7B:
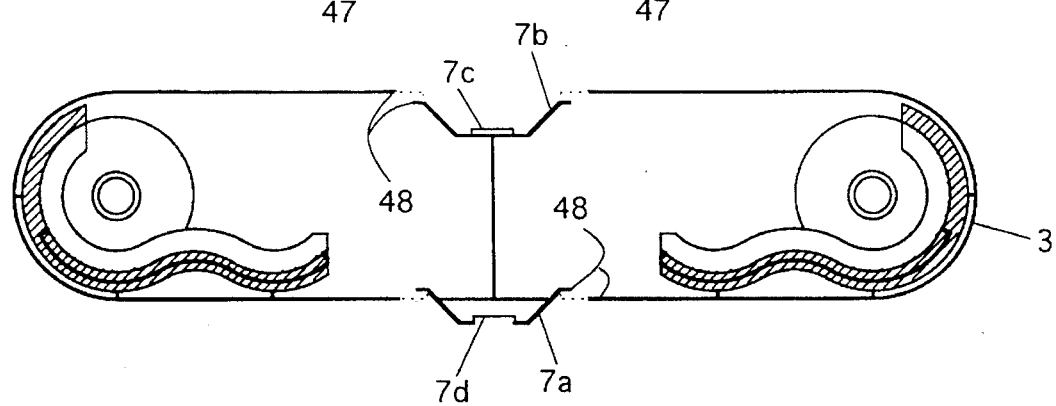
FIG. 7B is a cross-sectional view of the housing illustrating clamshell design for easy access to internal components.

Each system housing 3 has formed in the top surface thereof a nesting alignment structure shown in FIG. 7B and called a base insert 7b. On the bottom surface of each system housing 3 there is formed a nesting alignment projection called a base 7a shown in FIG. 7B. Stacking of a plurality of carousels 2 can vastly increase the capacity of the system to store optical discs 4 and retrieve data therefrom. To stack a plurality of carousels 2, the base 7a of each carousel 2 will be inserted into the base insert 7b of the carousel 2 below, and so on.

Two of the read head modules, of which module 1 is typical, are shown. The read-head modules 1 serve to spin the disc(s) and playback/record data therefrom using a laser diode 33. Each of the read-head modules 1 also includes a pick-up mechanism to engage an optical disc such as disc 4 when the disc 4 is in the pick-up sink (position two), lift the disc 4 up and out of the track 9 sufficiently to allow the rotating platform 5 to rotate within the so that other discs 4 may be accessed by other read-head modules 1. The read-head modules 1 also serve to spin the discs 4 and retrieve data therefrom or write data thereto using laser diode 33.

Figure 3:
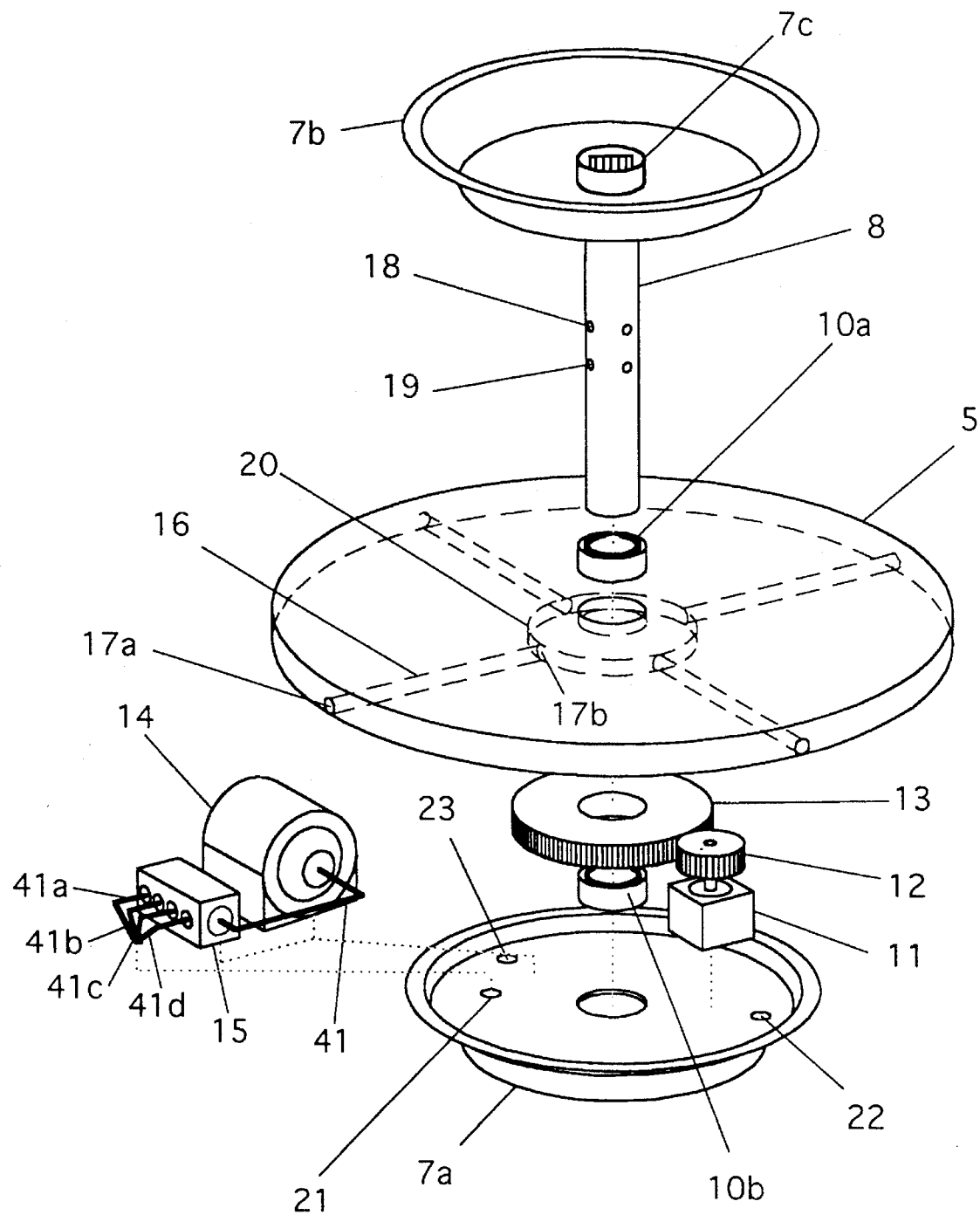
Figure 5:
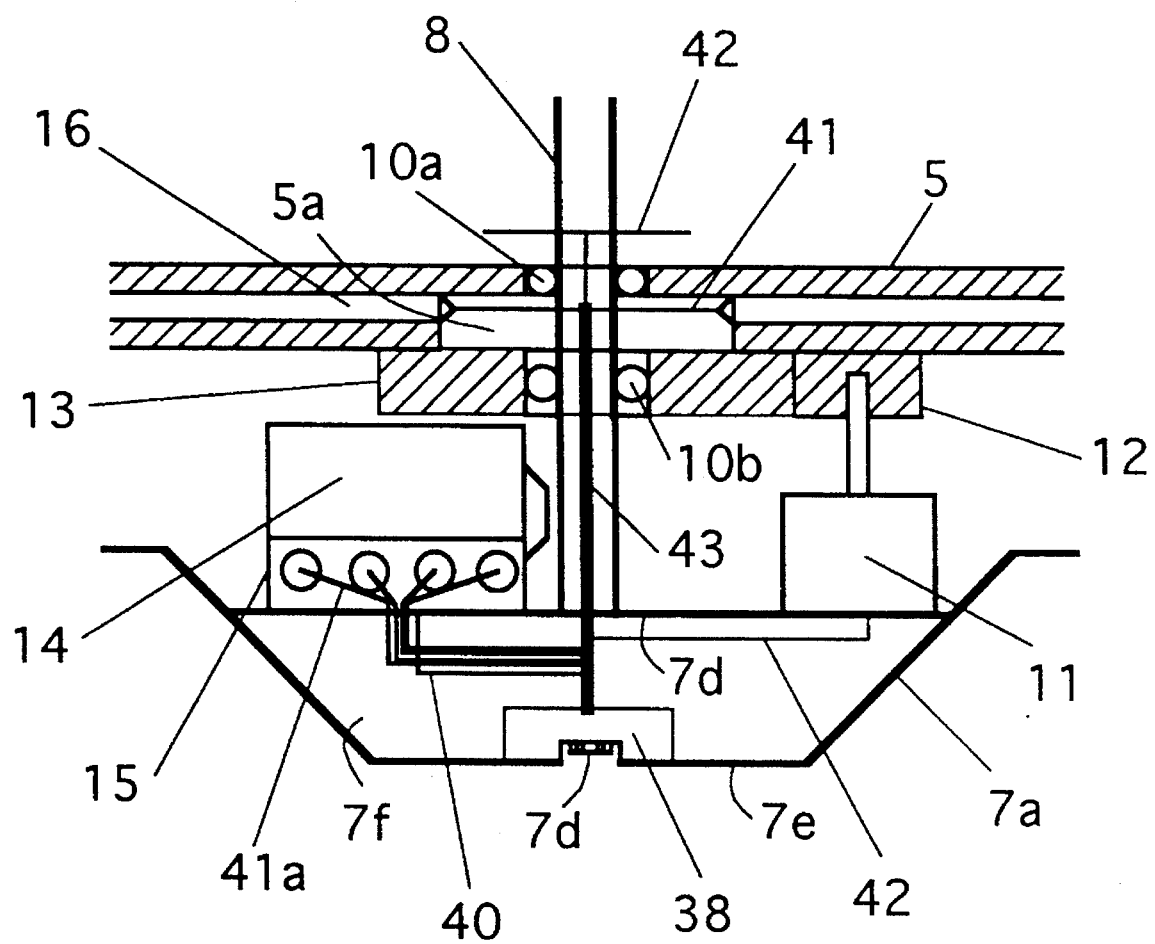

Referring to FIGS. 3 and 5, there is shown an exploded perspective view of the rotating platform 5 and the central pneumatic system. The rotating platform 5 is made of a material which is light enough to be rapidly accelerated but strong enough to support the mass of four read head modules 1 and four optical discs 4. The rotating platform 5 is rotated by a platform rotation stepper motor or voice coil actuator 11 which drives the platform 5 through a pinion gear assembly. The pinion gear 12 is coupled to the stepper motor or voice coil actuator 11 and the gear 13 is attached to the bottom surface of the rotating platform 5.

The rotating platform 5 has formed therein four platform pressure channels of which channel 16 is typical. Each platform pressure channel 16 is a hollow passage which forms a pneumatic pressure passageway between an outlet of which 17a is typical, and an inlet of which 17b is typical, located within the rotating platform 5 on the outer perimeter of the central chamber 5a serving as a tube insert space 20. An immobile support column 8 which is rigidly attached to the system housing 3 via the base 7a and base insert 7b serves as an axle around which the rotating platform 5 and its attached 13 gear rotates. The support column 8 is rigidly attached to the base insert 7b. In alternative embodiments, support column 8 and base insert 7b may be formed gas one piece. The support column 8 is coupled to the rotating platform 5 and its gear 13 via bearings 10a and 10b. Bearing 10a is fitted in the smaller of the two central holes in the rotating platform 5 and bearing 10b is fitted into gear 13. The support column 8 is fitted through bearings 10a and 10b which allows the rotating platform 5 to rotate freely with minimal friction.

In alternative embodiments, some other form of translation mechanism may be substituted for the rotating platform 5 if the array of optical discs 4 is not stored in a doughnut shaped circular array. For example, if the array of optical discs 4 is stored in two parallel horizontal arrays of parallel tracks 9, the read-head translation mechanism may be one or more rail following "flat cars" which slides along or otherwise translates down one or two rails running between the two parallel arrays of tracks 9 storing optical discs 4. Each track 9 has a pneumatic channel and each "flat car" read-head translation mechanism would have two or more read-head modules 1 facing in opposite directions, each of which is associated with one or more pressure channels 39 which could be selectively pressurized after the particular "flat car" and read-head module 1 had been aligned with a track 9 containing a disc 4 to be picked up. The optical discs 4 would be translated in their tracks 9 in a manner similar to the manner described herein for the circular array of tracks 9. Likewise, the read-head translation mechanism could also be a vertical set of tracks 9 on which a "flat car" like read-head module translation apparatus would move between twin vertical arrays of optical disc storage tracks arranged as a matrix of rows and columns of tracks 9 each of which stores an optical disc 4 vertically on end. Each track 9 would have a pressure channel 39 and disc translation within the track 9 and from the pick-up sink (position two) of the track 9 to the read/write transaction (position three) would be as previously described.

The base insert 7b is shaped so that it can be nested into the base 7a of another system to form a multisystem stack arrangement, or formed integrally therewith. This will be discussed later. In the preferred embodiment, each carousel 2 contains its own microprocessor 38 and RAM/ROM shown in FIG. 5 within the chamber 7f inside the base insert 7b. The microprocessor 38 is programmed to carry out loading, selection, retrieval, playback, restoration and ejection operations. The electronic control wires 42 for the stepper motor/voice coil actuator 11, pump 14 and solenoid operated pneumatic valve multiplexer 15 are connected to a circuit board 38 inside base insert 7a through openings 22 and 23. The control wires for the read-head modules 1 are routed into the hollow support column 8 through one or more ports of which port 18 is typical, and down to the base 7a. In alternative embodiments, serial or parallel bus connectors such as connector 7c and 7d may be mounted on the base insert 7b and the base 7a and may be connected to the wires that carry control signals for the motors 11, 24, 45 and 46, pneumatic pump 14 and solenoid controlled pneumatic valves 15 and wires that carry data from laser diodes 33 in the four read-head modules 1. These connectors 7c and 7d will be joined to mating connectors on carousels 2 above and below in a stacked arrangement so as to form a command, control and data bus that runs the length of the stack.

The central pneumatic system serves to selectively pressurize one or more of the platform pressure channels 16 and one or more of the track pneumatic channels 39 for purposes of moving the optical disc(s) 4 between sinks during the disc retrieve/return process. Pneumatic pump 14 supplies air pressure to a main pressure pneumatic line 41 which connects the pump outlet to the inlet of the solenoid controlled pneumatic valve multiplexer 15. The valve multiplexer 15 has a plurality of outlets 41a through 41d (four in the embodiment shown) each of which is connected, by a separate flexible plastic pneumatic tube, to a corresponding one of the four platform pressure channels, of which platform pressure channel 16 is typical. The individual flexible pneumatic tubing are labelled 41a through 41d in FIG. 3. These tubes are typically flexible surgical tubing and pass downward through base pressure tubing port 21 and cross over through an internal chamber within base 7a to an internal passageway in the center of support column 8. The pneumatic tubes 41a through 41d exit the support column 8 via four ports of which port 19 is typical. When support column 8 is fully inserted through the rotating platform 5, the openings 19 open upon a central chamber 20. The pneumatic tubes 41a through 41d exit the column pressure tubing ports 19, into the central chamber 20, and are securely attached to their respective platform pressure channel inlets, of 17b is typical. The electronics and software of the drive system, will allow any read-head module 1 to pick up any one of the optical discs 4, but will not allow more than one complete revolution of the rotating platform 5. Accordingly, the pneumatic tubes 41a through 41d are allocated an appropriate amount of slack, which is contained within the central chamber 20, therein to prevent entanglement of the tubes but also to allow one complete revolution of the rotating platform 5.

In alternative embodiments, the pneumatic pump 14 can output variable pneumatic pressure. The output pressure of the pneumatic pump 14 is controlled by the microprocessor 38 in accordance with the size of the optical disc 4 to be retrieved or returned.

Referring to FIG. 4A and FIG. 4B, shown are an exploded and a front view of a read-head module 1. The read-head modules 1 are mounted on the rotating platform 5. Each read-head module 1 is comprised of a read-head module housing 37 and components for optical disc playback/record (i.e. laser diode 33, DC-motor 45, voice coil 46) which are located on one of the arms 29. It also incorporates a pick-up mechanism to lift the disc 4 to a position (position 3 FIG. 6A) so as to not interfere with the rotation of the rotating platform 5.

The disc 4 mechanism is described below: An arm-mount 27 having a threaded hole 27a which is engaged with the threads of the lead screw 25. The arm-mount 27 serves to run up and down the lead screw 25 generating linear motion as the lead screw 25 is turned with the direction of linear travel dependent upon the direction of rotation of said read-head module DC-motor 24. The lead screw 25, is coupled to a read-head module DC-motor 24, which drives the lead screw 25, which is attached to the read-head module housing 37. The arm-mount 27 has attached thereto a hinge 26 which is also attached to end 26a of the male hub arm 30. The male hub arm 30 extends through the read-head module housing opening 26b in the read-head module housing 37 so as to put end 26a in proximity with the hinge 26 to which it is attached. A helical torsion spring 28 resides inside the hinge 26 and biases the hinge arm attached to male hub arm 30 so as to swing the male hub arm 30 counterclockwise relative to the axis of the lead screw 25 thereby tending to move male hub arm 30 as far away as possible from the female hub arm 29. The male hub arm 30 includes a cam follower called a cam contact hemisphere 35. The movement of the male hub arm 30 away from the female hub arm 29 is limited by contact between the cam contact hemisphere 35 and the hub engaging cam 36 which is best seen in FIG. 4B. The helical torsion spring 28 therefore biases the cam contact hemisphere 35 against the hub engaging cam 36 at all times.

The male hub arm 30 has a free spinning male hub member 31 which serves to engage the radial projections (not shown) in the center of a typical optical disc 4. The male hub member 31 mates with a female hub member 32 mounted on the female hub arm 29. The female hub arm 29 has an end, the female hub arm end, which 29a is typical. The female hub arm end 29a which projects through the read-head housing opening 26b and is attached to the arm-mount end 29b of the arm-mount 27. The female hub arm 29 also includes a laser diode 33 which is moved along a laser diode track 34 during the data retrieval or data writing process to retrieve data from or write data to the optical disc 4 selected. The two hub arms 29 and 30 include a female hub member 32 and a male hub member 31 designed to engage each other through the center hole of an optical disc 4 in a clamping action so the disc 4 can be secured for spin during the playback/recording process. The cam surface 36a is contoured so that the male hub arm 30 pivots away from the female hub member 32 to disengage the hubs 31 and 32 when the arms 29 and 30 are lowered. The male hub arm 30 pivots toward the female hub arm 29 to engage the hubs 31 and 32 when the arms 29 and 30 are lifted.

The laser diode track 34 is long enough that full radial movement for the laser diode 33 can be achieved such that all tracks 9 on the disc 4 may be accessed. Alternatively, In embodiments where multiple sizes of discs 4 are to be accommodated, the size of the laser diode track 34 is selected to be long enough to accommodate the largest disc 4 to be engaged by that read-head module 1 and the microprocessor 38 controls the linear stepper motor 46 in accordance with the size of disc 4 being accessed.

Referring to FIG. 4B, there is shown an end view of the disc engaging mechanism of the disc transport system looking straight into read-head module housing opening 26b. Each of the female hub arms 29 and the male hub arms 30 have mounted thereon at the lower extremities thereof an optical sensor 44 comprised of light source 44a and a light sensitive element 44b coupled to the microprocessor 38 either directly or by interface circuitry in some embodiments. The purpose of this optical sensor 44 is to sense the presence of an optical disc 4. As soon as the optical disc 4 rolls from the storage sink (position one FIG. 6A) into the pick-up sink (position two FIG. 6A), the light beam between source 44a and light sensitive element 44b will be broken and the microprocessor 38 will know that the disc 4 is available to be picked up and read. In some embodiments, the light source 44a will be on at all times, and in other embodiments, the microprocessor 38 will periodically poll each read-head modules optical sensor pair by causing the light source 44a to turn on and reading the state of the light sensitive element 44b. When a disc 4 is present between arms 29 and 30, the light beam between source 44a and sensor 44b will be interrupted, and the microprocessor 38 will learn of this fact either by an interrupt generated by interface circuitry or by the polling operation previously described.

When the presence of a disc 4 is sensed, the microprocessor 38 starts the read-head module DC-motor 24 in FIG. 4A and causes the lead screw 25 to turn in the appropriate direction to cause the arm-mount 27 to rise up the lead screw and pull the female hub arm 29 and the male hub arm 30 up with it. As the arms 29 and 30 move up, the cam contact hemisphere 35 mounted on the male hub arm 30 begins to track upward on the surface of the hub engaging cam 36. This pivots the male hub arm 30 toward the female hub arm 29 around the centerline of the hinge 26. The lead screw 25 is of such a length and the relative positioning between the bottom of the lead screw 25 and the bottom of the pick-up sink (position two FIG. 6A) in the track 9 is such that when the arm-mount 27 is at the bottom of the lead screw 25, the cam contact hemisphere 35 is at or near the bottom edge of the cam surface 36a, and the male and female hubs 31 and 32 are located below the hole in the center of the optical disc 4. When the cam contact hemisphere 35 has moved sufficiently up the cam surface 36a to reach the asymptotic portion of thereof at 36b, the movement of the male hub 31 toward the female hub 32 is sufficient to cause the two to converge and engage the radial projections of the optical disc 4. After the two hubs 31 and 32 engage the disc 4, the lead screw 25 continues to turn and the optical disc 4 is lifted up and out of its track 9 to position 3 shown in phantom in FIG. 6A. The hubs 31 and 32 remain engaged because of the constant thickness of the hub engaging cam 36 over the asymptotic portion 36b. When the disc 4 reaches position 3 (shown in FIG. 6A), it is clear of all obstructions and is free to rotate without any friction sources other than in the disc hub drive mechanism itself.

Multiple sizes of optical discs 4 within the same system housing 3 can be accommodated by having read-head modules 1 which are adapted to pick-up any size disc 4 in some alternative embodiments. The preferred one of these alternative embodiments is to have a rotating platform 5 which has a plurality of different read-head modules 1, each of which is designed with different physical proportions selected for operation of the read-head module 1 with a particular size of optical disc 4.

When the rotating platform 5 is to be rotated, in the preferred embodiment, it is necessary to have moved all optical discs 4 back to their storage sinks (position one FIG. 6A) except optical discs 4 which have been engaged and picked up so that the arms 29 and 30 of read-head modules 1 which are not currently engaged with a disc 4 can move freely past the pick-up sinks (position two FIG. 6A) of tracks 9 which lie between their current positions and the track 9 to which they are currently in seek translation. In alternative embodiments, all arms 29 and 30 could be moved to their highest position, before a seek movement is started, and the highest position would have to be high enough that even a pair of arms 29 and 30 currently engaged with an optical disc 4 would be lifted high enough that both the arms 29 and 30 and any engaged optical discs 4 would clear any optical discs 4 remaining in their pick-up sinks(position two).

Because the distance between the centerline of the male hub 31 and the centerline of the hinge 26 is so great, and because the angle through which the male hub arm 30 swings to engage the optical disc 4 is so small, the movement of the male hub 31 toward the female hub 32 is essentially linear.

After the optical disc 4 has been engaged, a hub DC-motor 45 is turned on and the optical disc 4 is spun at an appropriate speed. The microprocessor 38 can distinguish between the various types of optical discs 4 by an automatic discrimination routine analyzing the data read from the disc 4 and causes the hub DC-motor 45 to spin at a speed appropriate to the type of disc 4 which has been picked up. After the disc 4 is spinning, the microprocessor 38 drives a voice coil actuator or linear stepper motor 46 for the laser diode 33 so that the data encoded on the disc 4 may be retrieved for output or data may be recorded on the disc 4.

FIG. 5 shows a cross-sectional view in elevation through the central portion of the carousel 2 showing the relationships of the various parts. Note how support column 8 is coupled to rotating platform 5 by bearing 10a and is also coupled to gear 13 by bearing 10b. Platform rotation stepper motor or voice coil actuator 11 is mounted on the upper surface 7d of the base 7a. Motor control wires 42 pass under surface 7d and are routed up through a wiring/pneumatic tube conduit 43 to exit ports 18 further up the support column 8. Likewise the control wires 40 for the pneumatic pump 14 and solenoid controlled pneumatic valve system 15 run beneath surface 7d to wiring/pneumatic tube conduit 43 and are routed through to the microprocessor 38 which is mounted on a printed circuit board located at the bottom 7e of the internal chamber 7f within base 7a. The pneumatic tubes 41a through 41d are routed through the wiring/pneumatic tube conduit 43 up to column pressure tubing ports 19 in support column 8 which open onto central chamber 5a in rotating platform 5. From there the four individual pneumatic tubes 41a through 41d are routed to their respective platform pressure channel inlets 17b for their assigned platform pressure channels 16.

Figure 6A:
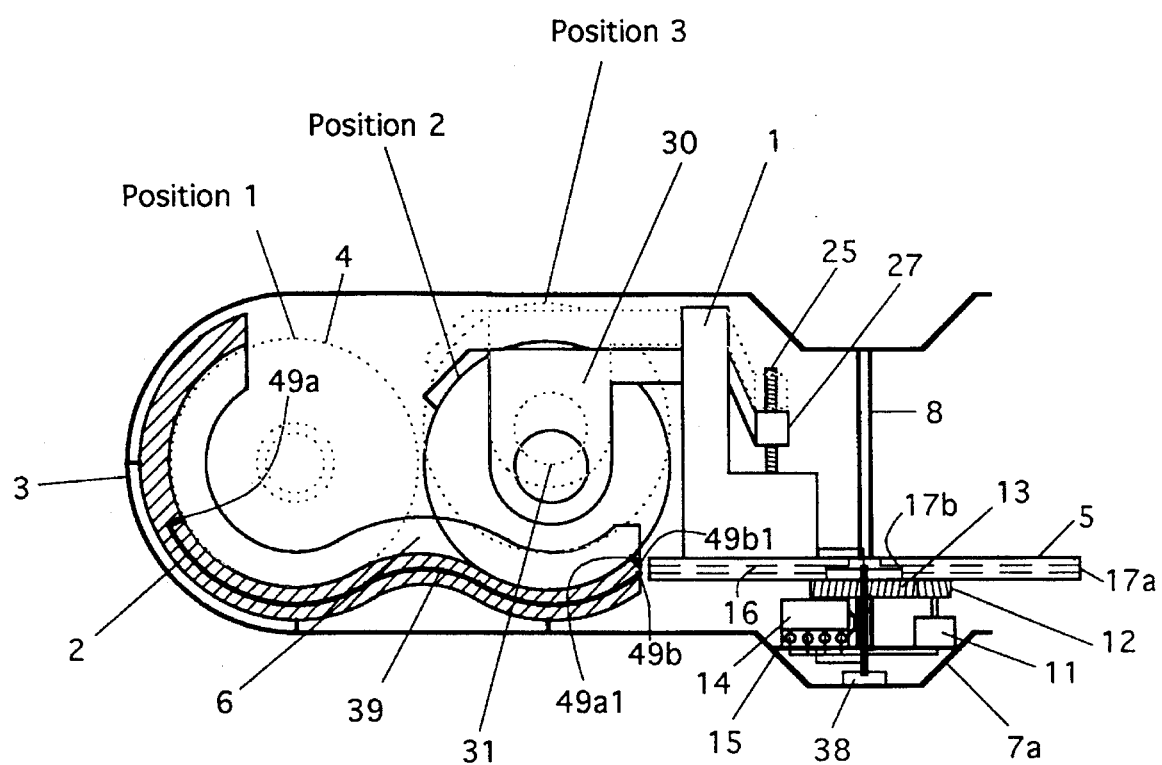
FIG. 6A is a diametrical cross-sectional view of the carousel illustrating the disc retrieve/return process and the mechanisms involved.
Figure 6B:
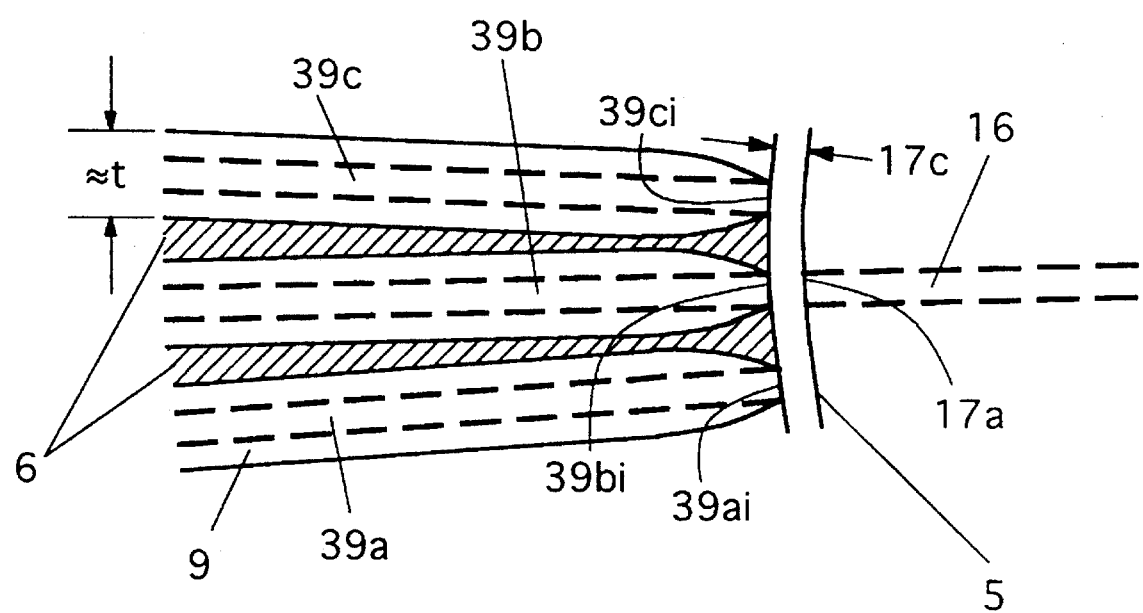
FIG. 6B is a top view of the carousel and platform illustrating the coupling between a pressure channel in the rotating platform and the pressure channels in each carousel track.

Referring to FIG. 6A there is shown a cross-sectional drawing in elevation showing the relative positioning of all the elements of the disc transport system and illustrating the operation thereof. The microprocessor 38 will receive data indicating which disc(s) 4 are to be retrieved and played back. This data can come from a user via a control panel (not shown) or can come from a computer/server which receives a read command from an application program running somewhere on the network(s) to which the server is coupled or running on the computer/server itself. The microprocessor 38 then accesses a lookup table stored in a: ROM (not shown); battery backed up RAM (also not shown); or on magnetic media (not shown) with which the microprocessor 38 can perform read or read/write transactions. The lookup table may also be stored on an optical disc 4 stored in the carousel 2 itself. The microprocessor 38 uses the volume label or title of the desired optical disc 4 as an address into the lookup table and maps this volume label or title to the appropriate track storing the desired disc 4. The microprocessor 38 then sends appropriate commands to the platform rotation stepper motor or voice coil actuator 11 to cause the rotating platform 5 to be rotated such that the closest available read-head module 1 is positioned on the track 9 storing the desired disc 4. The phrase "positioned on" means the alignment shown in FIG. 6B where the centerline of the platform pressure channel 16 is aligned with the centerline of the carousel pressure channel 39b of the selected track 9. FIG. 6B shows three tracks 9 having three carousel pressure channels 39a, 39b and 39c. These three carousel pressure channels 39a, 39b and 39c have carousel pressure channel inlets 39ai, 39bi and 39ci. In the above example, the middle track 9 having carousel pressure channel 39b is selected. To retrieve the optical disc 4 stored in this track 9, the platform pressure channel 16 is rotated such that its platform pressure channel outlet 17a is directly across from the carousel pressure channel inlet 39bi of carousel pressure channel 39b.

The four read-head modules 1 are mounted 90° apart in the preferred embodiment, but in other embodiments, more read-head modules 1 could be used and their angular separation can be arbitrary so long as enough space is saved between each read-head module for freedom of operation and easy access for installation or repair. It is preferred to evenly distribute the read-head modules 1 to shorten the distance the rotating platform 5 has to move to reach any particular track 9 to the shortest possible distance to speed up access time.

To retrieve the disc 4, the microprocessor 38 polls the optical sensors 44 of all the read-head modules 1 to see which ones are vacant and available to pick-up a disc 4. The microprocessor 38 then compares the position of each available read-head module 1 to the position of the track 9 storing the desired disc 4 and selects the read-head module 1 closest to the desired track 9. In some embodiments, each read-head module 1 will have a home position and will return to that position after picking up a disc 4 so the microprocessor 38 knows where each read-head module 1 is by assuming that it is at its home position. In other embodiments, the microprocessor 38 keeps a running tally in memory of where each read-head module 1 is by keeping track of the seek commands issued and completed in the same manner as an inertial navigation system keeps track of where a ship or plane is by keeping tally of course, speed and time for each leg of a journey starting from a known position and then calculating the present position. In other embodiments, a shaft encoder (not shown) optically coupled to the shaft of the platform rotation stepper motor or voice coil actuator 11 or to the rotating platform 5 itself and electrically coupled to the microprocessor 38 via wires 42 (see FIG. 5) is used by the microprocessor 38 to determine the locations of the available read-head modules 1. In this preferred embodiment, after each seek movement of the rotating platform 5, the read-head modules 1 are left in the positions to which they have been moved. Likewise, after each disc 4 is redeposited in its track 9, the read-head module 1 is left at the position to which it was moved to return the disc 4 to its track 9. The microprocessor 38 can determine the positions of each available read-head module 1 by calculating a reference point from the shaft encoder (not shown) on the rotating platform 5. The microprocessor 38 determines the angle offset of the reference point from the reference position by the summation of previous rotation angles, which can reduce unnecessary movements, thus reducing access time in some embodiments where the same optical disc 4 is repeatedly accessed. In the latter situation, since the read-head module 1 which returned the disc 4 to its track 9 is likely to still be located at the track 9 assigned to the disc 4, no seek time is necessary to move the rotating platform 5 to the track 9 of the frequently accessed disc 4.

After an open read-head module 1 has been positioned at the selected track 9, the microprocessor 38 sends appropriate command signals to activate the pneumatic pump 14 and open the solenoid controlled pneumatic valve multiplexer 15 having its outlets 41a through 41d coupled by a pneumatic tube to the appropriate platform pressure channel 16 positioned on the selected track 9, as to pressurize the selected platform pressure channel 16. Because the gap 17c in FIG. 6B between the platform pressure channel outlet 17a of the selected platform pressure channel 16 and the carousel pressure channel inlet 39bi of the selected carousel pressure channel 39 is small, the pressurized air exiting the platform pressure channel outlet 17a couples into the carousel pressure channel inlet 39bi and pressurizes the selected track 9 and pressure channel 39b. The pressurized air then exits the carousel pressure channel 39b at a carousel pressure channel outlet 49a located at position 1 in FIG. 6A and exerts an air pressure force on the edge of the optical disc 4 located in the selected track 9. The pneumatic pressure must be adequate to exert sufficient force on the edge of the optical disc 4 in position 1 (FIG. 6A) to overcome the disc inertia and cause the disc 4 to move up the slight incline at position 2 and sink down into position 2 for pick-up (FIG. 6A). The pressurized air in the carousel pressure channel 39b also pressurizes a second carousel pressure channel outlet 49a located at position (FIG. 6A) which serves as an air brake to stop the rolling motion of the optical disc 4 when it reaches position 2 (FIG. 6A). In this type of embodiment, the solenoid controlled pneumatic valve multiplexer 15 is left open for a time long enough for the optical disc 4 to reach position 2 (FIG. 6A) and stop. In other embodiments, the track 9 can be tapered down to a narrower width to act as a friction brake to stop the motion of the optical disc 4 as it rolls into position 2 (FIG. 6A). In this embodiment, the solenoid controlled pneumatic valve multiplexer 15 is left open only long enough to allow the airflow to move the disc 4 out of position 1 (FIG. 6A).

After the disc 4 has arrived in position 2 (FIG. 6A), the read-head module 1 then works in the manner previously described to pick-up the optical disc 4 from position 2 and lift it to position 3 shown in phantom in FIG. 6A.

To replace the disc 4 in its track 9, the process described above is reversed. First, the read-head module 1 is positioned on the track 9 from which the disc 4 came if necessary. Then, the lead screw 25 is turned in the opposite direction as it was turned when the disc 4 was picked up to lower the disc 4 down into its track 9 and disengage the male and female hubs 31 and 32 in FIG. 4B. The appropriate solenoid controlled pneumatic valve multiplexer 15 is then selected and the pneumatic pump 14 is turned on by the microprocessor 38 so as to pressurize the second carousel pressure channel outlet 49a1 located at position 2 (FIG. 6A). Pressurized air emitted therefrom exerts an air pressure force on the optical disc 4 and causes it to roll from position 2 to position 1 (FIG. 6A). The solenoid controlled pneumatic valve multiplexer 15 may be shut off after the disc 4 starts to roll with sufficient speed to overcome the slight incline in the track 9 between the sinks of positions 1 and 2 (FIG. 6A) so that the pressurized air emitted from carousel pressure channel outlet 49a does not interfere with return of the disc 4 to position 1 (FIG. 6A). The rising curved track 9 at the outside perimeter of the carousel 2 acts as a brake to stop the motion of the disc 4 when it reaches position 1 (FIG. 6A).

Figure 6C:
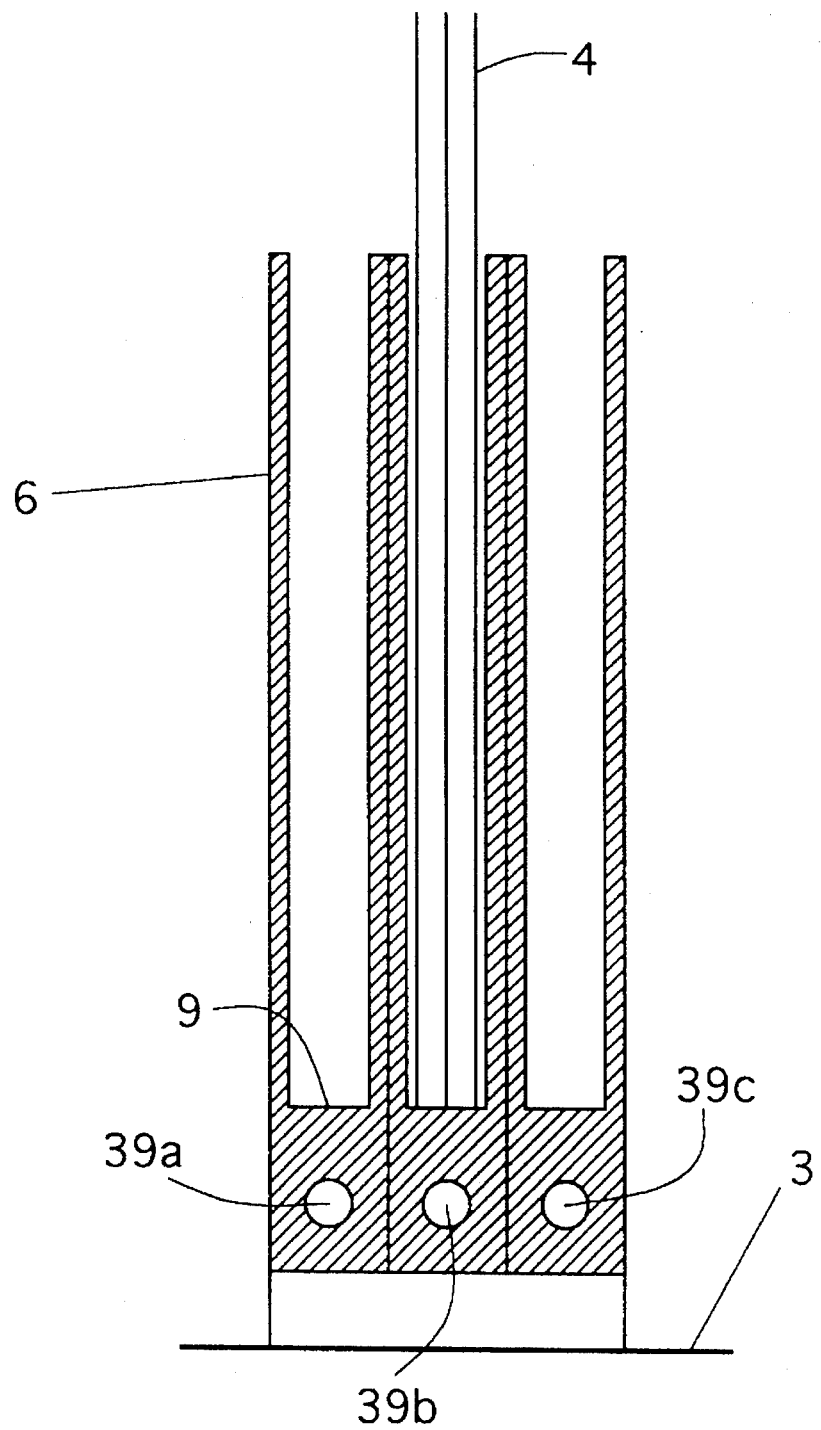
FIG. 6C illustrates a cross-sectional view (which is perpendicular to the track) of the carousel, the preferred embodiment of the carousel containing three tracks where the dividers have straight walls.

Referring to FIG. 6C, there is shown a cross-sectional view of the pneumatic pressure input end section of the preferred embodiment of a carousel 2 containing three tracks 9 with straight walled dividers 6. In FIG. 6C, the distance between adjacent walls of the dividers 6 is approximately equal to but slightly greater than "t" where "t" equals the thickness of the disc 4. The amount of clearance between the sides of the optical disc 4 and the dividers 6 is such that the frictional forces tending to resist movement of the disc 4 can be overcome by the pneumatic pressure.

Figure 6D:
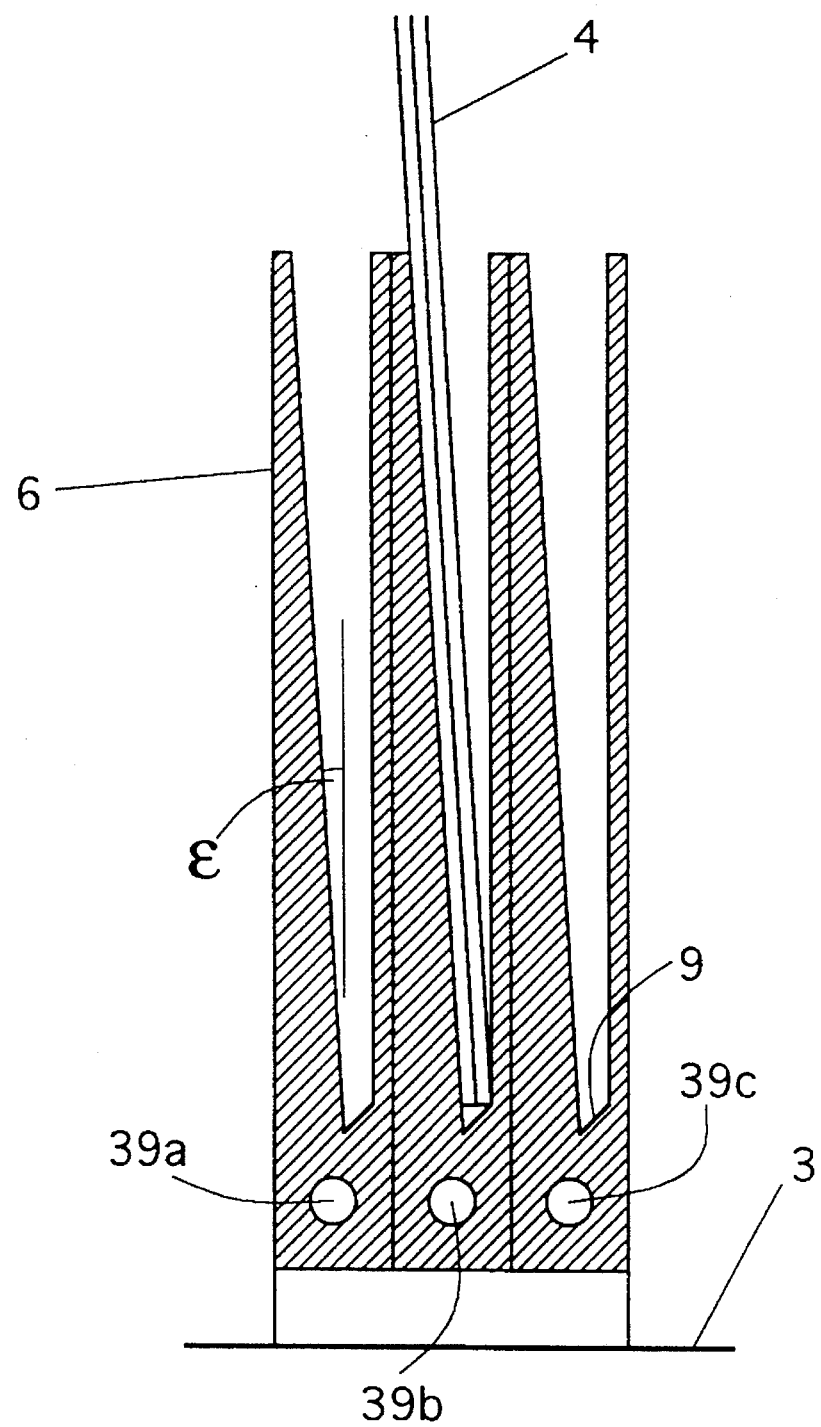
FIG. 6D is a cross-sectional view (which is perpendicular to the track) illustrating a different embodiment of the carousel containing three tracks where the dividers have one angled wall.

Referring to FIG. 6D, there is shown a cross-sectional view of the pneumatic pressure input end section of another embodiment of a carousel 2 containing three tracks 9 with dividers 6 which have one angled wall.

FIG. 7A is a top view of the carousel 2 showing the clamshell structure for access to the internal mechanisms. The system housing 3 is split into two halves which are hinged at housing hinge 50 such that the two halves may be spread open like a clamshell. This allows easy access to the internal mechanisms for installation, repair or entire disc library removal. The opposing edges of the central joint of the system housing 3 are fitted with snap-in fittings 48 such that the two halves may be joined by snapping them together.

FIG. 7B is a cross-sectional view of the carousel 2 emphasizing the modular nature of the carousel 2 showing the top and bottom nesting structures 7a and 7b. FIG. 7B also shows the bus connectors 7c and 7d which mate with opposite sex connectors on carousels 2 above and below to allow a stack of carousels 2 to operate from a single command, control and data bus.

Figure 8:
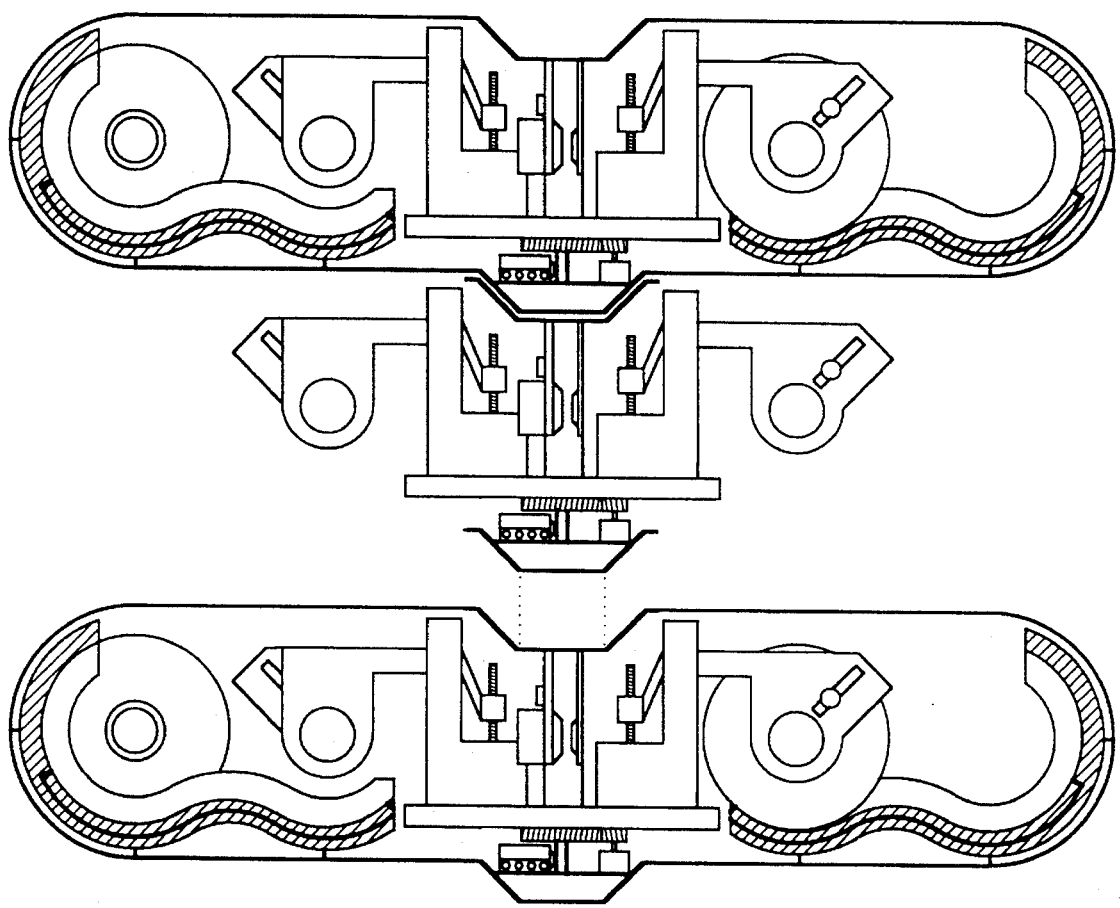

FIG. 8 shows a nested stack of carousels 2 although the bus connectors 7c and 7d are not shown.

Each system housing 3 has formed in the top surface thereof a nesting alignment structure shown in FIG. 7B and called a base insert 7b. On the bottom surface of each system housing 3 there is formed a nesting alignment projection called a base 7a. Stacking of a plurality of carousels 2 can vastly increase the capacity of the system to store optical discs 4 and retrieve data therefrom. To stack a plurality of carousels 2 the base 7a of each carousel 2 will be inserted into the base insert 7b of the carousel 2. In alternative embodiments, serial or parallel bus connectors such as bus connector 7c and 7d may be mounted on the base 7a and base insert 7b and may be connected to the wires that carry control signals for the motors 11, 24, 45 & 56, pneumatic pump 14 and solenoid controlled pneumatic valves 15 and wires 42 that carry data from the laser diodes 33 in the four read-head modules 1. These connectors 7c and 7d will be joined to mating connectors on carousels 2 above and below in a stacked arrangement so as to form a command, control and data bus that runs the length of the stack. The base insert 7b for receiving the base 7a of the carousel 2 above for nesting purposes is attached to the support column 8 or formed integrally therewith.

Optical discs 4 are inserted into the carousel 2 through a single optical disc entry/exit slot 47 shown in FIG. 7A. This optical disc entry/exit slot 47 opens onto a single disc entry/exit arm track 61 and index track 60, used both as an index track 60 and as the storage track for temporary storage of a disc 4 being loaded into the carousel 2 during the process by which the disc 4 is delivered to its assigned track, of which 9 is typical. Referring jointly to FIGS. 9A and 9B, 10A and 10B and 11, the apparatus for loading of discs 4 will be described. After the user inserts the disc 4 into the optical disc entry/exit slot 47, it assumes position 1 shown in FIG. 10. As the disc 4 is pushed into the optical disc entry/exit slot 47, it comes into contact with a disc 4 entry/exit arm 51. As the disc 4 is pushed further into a disc entry/exit arm track 61 in the disc entry/exit arm 51 to position 2 (FIGS. 10A, 10B and 11) the disc entry/exit arm 51 rotates downward about the disc entry/exit arm hinge 57 because of the curvature of the portion of the track 61 facing away from the rotating platform 5. The disc entry/exit arm hinge 57 is mounted to the disc entry/exit arm 51 and an index track 60 via hinge insert slots 54 formed in the walls of the dividers 6, only for the optical disc entry/exit slot 47.

Figure 10A:
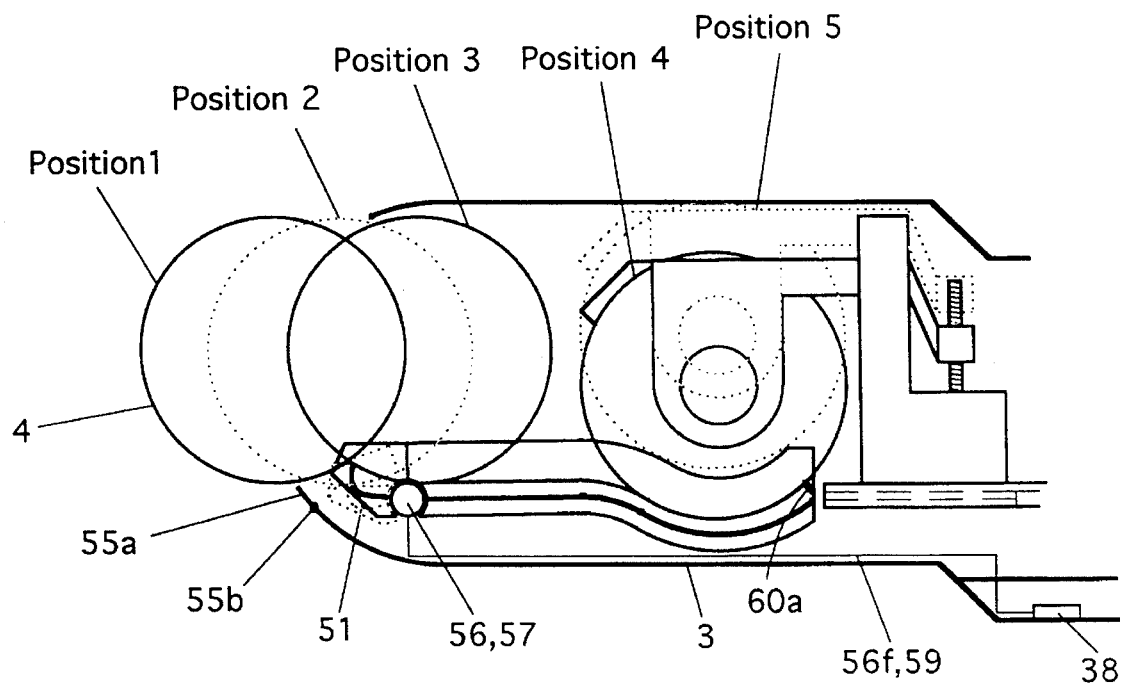
FIGS. 10A and 10B are side views of the optical disc entry/exit track illustrating the optical disc entry/exit process.

Attached to the disc entry/exit hinge 57 is a D'Arsonval motor 56 which has torsional spring characteristics when no current is applied to the D'Arsonval motor 56. The details of this spring loaded hinge structure with the D'Arsonval motor 56 are best seen in FIG. 9B. The D'Arsonval motor 56 is comprised of two permanent magnets 56a mechanically stabilized by a frame 56d which does not rotate, a rotor coil 56b mechanically affixed to a central rotor 56g, and a torsional spring 56c anchored to the frame 56d at point 56e and coupled to bias the central rotor 56g to rotate clockwise. The central rotor 56g is coupled to the disc entry/exit arm 51. DC current is applied to the D'Arsonval motor 56 through wire leads from the D'Arsonval motor 56f. The wires 56f for the D'Arsonval motor 56 and the wires 59 for the optical sensor 62 in FIG. 9A are routed beneath the carousel 2 and tracks 9 but inside the system housing 3 to the microprocessor 38 as best seen in FIG. 10A. When no current is applied to the D'Arsonval motor 56, it acts like a torsional spring 56c. When current is applied to the rotor coils 56b, a central rotor 56g of the disc entry/exit arm hinge 57 mechanically coupled to the rotor coils 56b rotates with respect to the frame 56d under the influence of the torque generated by the D'Arsonval motor 56. Thus, when the optical disc 4 is completely inside the system housing 3 (not shown in FIG. 10a) and has reached position 3 (FIGS. 10A, 10B and 11), the disc entry/exit arm 51 returns to its original position closing off the optical disc entry/exit slot 47 because of the spring bias applied to the disc entry/exit hinge 57 by the de-energized D'Arsonval motor 56.

Figure 10B:
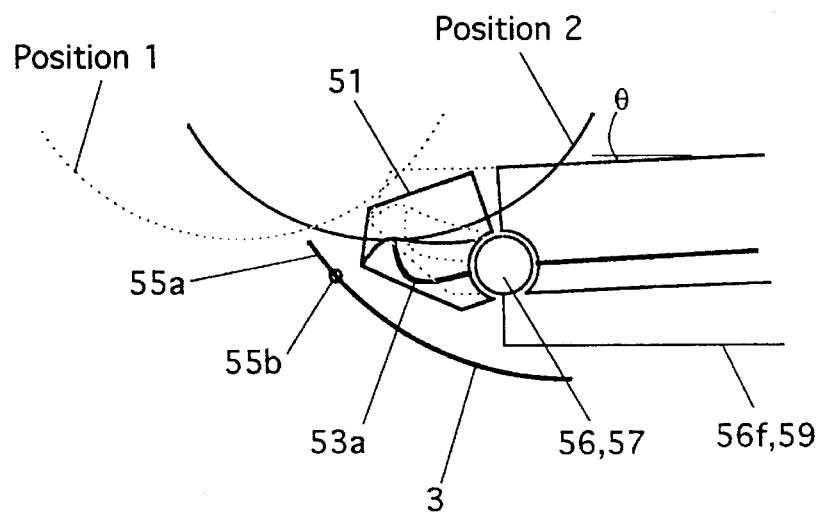
Figure 11:
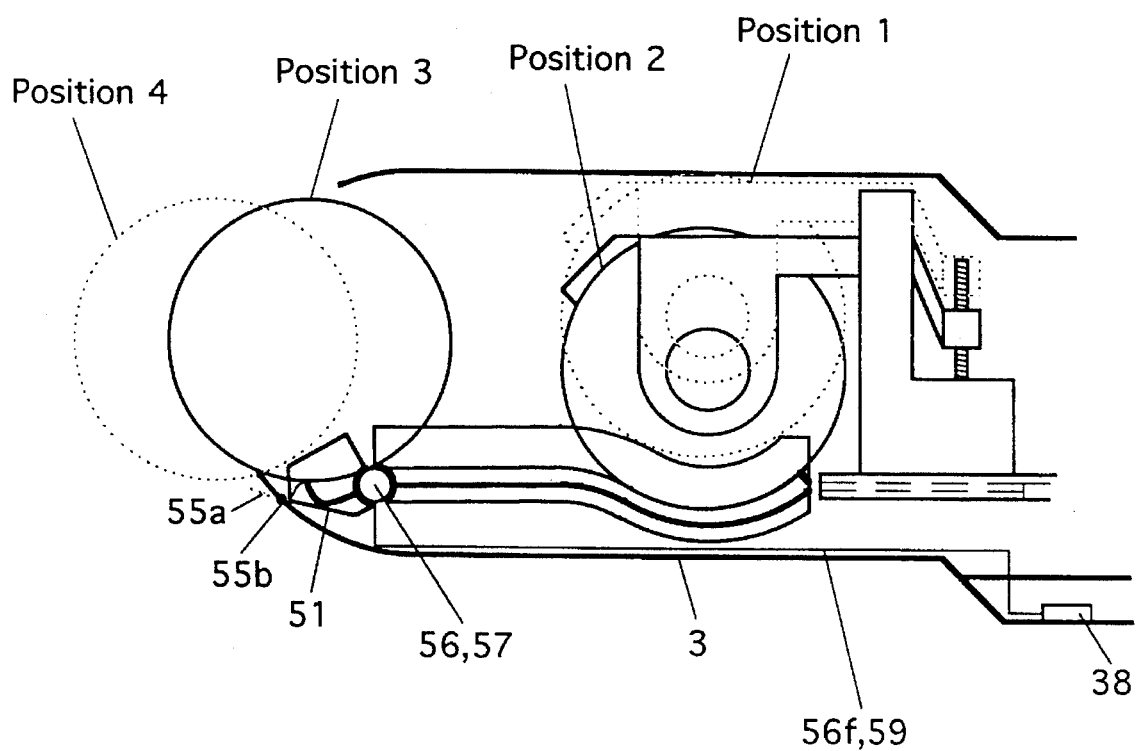

Once the disc 4 has reached position 3 (FIGS. 10A, 10B and 11), it is held in place by an incline in the index track 60 (best seen in FIG. 9A) and the disc entry/exit arm track 61. The portion of the disc entry/exit arm track 61 which faces the rotating platform 5 is curved to cradle the optical disc 4 in position 3 as shown in FIG. 10A. An optical sensor 62 (best seen in FIG. 9A) senses the arrival of the disc 4 at position 3 (FIGS. 10A, 10B and 11). The optical sensor 62 is either periodically polled by the microprocessor 38 via control lines 56h or generates an interrupt to the microprocessor 38 each time a disc 4 arrives at position 3 (FIGS. 10A, 10B and 11). Upon determining that a disc 4 has arrived at position 3 (FIGS. 10A, 10B and 11), the microprocessor 38 (not shown in FIGS. 9A or 9B) determines which of the available read-head modules 1 is closest to the index track 60 in which the new disc 4 rests, and the microprocessor 38 then sends appropriate commands to cause the selected read-head module 1 and the rotating platform 5 to rotate to the position of the index track 60.

The optical disc 4 is picked up from the index track 60 in much the same manner as from any other track 9. First, the microprocessor 38 sends an appropriate command to open the solenoid controlled pneumatic valve multiplexer 15 coupled to the platform pressure channel outlet 17a aligned with the index track 60. The microprocessor 38 then activates the pneumatic pump 14 thereby causing pressurized air flow into a carousel pressure channel 39 in the index track 60 (best seen in FIG. 9A). The pressurized air is coupled from carousel pressure channel 39 to a disc entry/exit arm pressure channel 53a past the disc entry/exit arm hinge 57 via a connecting tube 52. The pressurized air leaves the disc entry/exit arm pressure channel 53a via disc entry/exit arm pressure channel outlet 53c.

The pressurized air exiting disc entry/exit arm pressure channel outlet 53c in FIG. 9A pushes the optical disc 4 up an incline in the index track 60. The disc 4 then settles into a sink at position 4 shown in FIG. 10A. Because of this incline, shown as angle ▨ in FIG. 10B, the disc 4 will not automatically roll from position 3 in FIG. 10A to position 4 in FIG. 10A.

The optical sensor 44 on the read-head module hub arms 29 and 30 senses when the optical disc 4 being loaded has arrived at position 4 (FIGS. 10A, 10B and 11) and is available for pick-up. The microprocessor 38 then controls the pick-up of the disc 4 in the manner previously described to lift the disc 4 to position 5 in FIG. 10A. However, instead of retrieving data from the disc 4 or writing data thereto, the microprocessor 38 commands the rotating platform 5 to rotate to an empty track 9 and deposits the optical disc 4 therein. In some embodiments, the microprocessor 38 prompts the user for information as to the volume label and in other embodiments, the microprocessor 38 reads the volume label information from the optical disc 4 itself. In either embodiment, the microprocessor 38 records the volume label information in the lookup table for later access of the disc 4.

Disc exit is processed in the following manner. The user or another computer notifies the microprocessor 38 of the volume label of the disc 4 to be exited. The microprocessor 38 then looks up the volume label in its lookup table and dispatches the appropriate commands to locate the closest available read-head module 1 and align it with the track 9 in which the desired disc 4 is stored (position one FIG. 6A). The appropriate commands are then issued to cause the disc 4 to be moved to the pick-up sink (position two FIG. 6A) and picked up. The microprocessor 38 then dispatches appropriate commands to cause the platform rotation stepper motor or voice coil actuator 11 to align the rotating platform 5 and the read-head module 1 which picked up the selected disc 4 with the index track 60. The disc 4 is then lowered from position 5 into position 4 in FIG. 10A.

The microprocessor 38 then sends current through the wires 56f of the D'Arsonval motor 56 (see FIGS. 9A and 9B) which causes the disc entry/exit arm 51 and the disc entry/ exit slot door 55a to rotate down to its final position shown in FIG. 11. The microprocessor 38 then causes the central pneumatic system to pressurize the carousel pressure channel 39 in the index track 60. This causes pressurized air to exit the index track pressure channel outlet 60a in FIG. 10A which pushes the disc 4 up the slight incline at position 4 (FIG. 10A) and then the optical disc 4 will roll down the slight decline to where it is stopped by the disc entry/exit slot door 55a as shown in FIG. 11.

At positions 2 and 1, part of the disc 4 is outside the system housing 3 and the user may manually remove the disc 4 by pulling the disc 4 out of the system housing 3. The disc entry/exit slot door 55a is hinged at 55b in FIG. 11 by the entry/exit door "spring loaded" hinge 55b. When the disc 4 is pulled out by the user, the disc entry/exit door hinge 55b rotates to move the disc entry/exit slot door 55a out of the way. After the disc 4 is removed, the disc entry/exit door hinge 55b rotates the disc entry/exit slot door 55a back to its original position. The microprocessor 38 then polls the optical sensor 62 or an interrupt is generated upon a state change indicating that the disc 4 has exited the system. The microprocessor 38 then cuts off current flow to the D'Arsonval motor 56 which allows the torsional spring 56c to rotate the disc entry/exit arm 51 back to its original position.

The autoload disc installation is processed in the following manner. The autoload disc installation procedure consists of extracting the start up files for all multi session CDs and CD-ROMs from either: a) a CD-ROM; b) a memory chip; or c) a battery backed RAM all of which may be housed within the carousel 2 of said invention as a disc 4 is selected by the user via computer interface, several actions occur simultaneously: a) the rotating platform 5 is moved to line up a read-head module 1 with said selected disc 4; b) the pneumatic pump 14 is activated; c) the start up and authoring files for multi session CDs and CD-ROMs are accessed from wherever they are stored and transferred to: 1) a memory resident file(s); 2) a memory chip; 3) a CD-Recordable drive; or 4) an external hard drive.

Detail of Files.

These files instruct the read-head modules 1 as to what type of multi session CD or CD-ROM is selected for access. These start-up files have inherent field searches to the specific disc 4 (multi session). These files also specify spin rate and compression variables.

Simultaneous access of these start-up files in conjunction with movement to, pick-up and data access to/from the selected disc title will reduce the total information access time. Because there is no hand-shaking with a host or client server computer or network, total access time is speeded up by elimination of the hand-shake bottleneck. This feature better enables the system to act as a server and not just as a black box or dumb terminal. This also allows communication via modem for fast data access retrieval time. Typically the bottleneck of any data retrieval system is the continuous hand-shaking between computer and peripherals.

Those of ordinary skill in the art will realize that the following description of the present invention is illustrative only and not in any way limiting. Other embodiments of the invention will readily suggest themselves to persons skilled in the art.

While embodiments and applications of this invention have been shown and described, it would be apparent to those skilled in the art that many more modifications than mentioned above are possible without departing from the inventive concepts disclosed herein. The invention, therefore, is not to be restricted except in the spirit of the appended claims.

What is claimed is:

1. An apparatus for storing and reading a plurality of information discs, comprising:

a circular storage magazine for storing a plurality of said information discs, said storage magazine including a plurality of radially disposed tracks, each of which stores one information disc and each of which has a first and a second stable position in which a vertically oriented information disc rests on edge under the influence of gravity, each of said tracks having separating means between said first position and said second position such that said information disc are prevented from rolling to another position on said track under the influence of gravity, said first position comprising a storage location and said second position comprising an information disc pick-up position;

pneumatic means for blowing a selected information disc from said first position to said second position using pressurized air along air channels disposed in each of said tracks such that said information disc is accessed by one of a plurality of read-head means and for blowing said selected information disc from said second position to said first position subsequent to said accessing of said information disc;

means for positioning said pneumatic means at the location of a track storing said selected information disc, said positioning means being coupled to said pneumatic means, wherein said read-head means is mounted on said positioning means;

means for triggering said pneumatic means at said first position or said second position;

means for engaging said selected information disc at said second position and for lifting said information disc to a third position clear of the track in which said information disc rests; and a spindle motor for spinning said information disc in said third position such that said information disc is accessed by said read-head means for writing data thereon or reading data therefrom.

2. An apparatus as defined in claim 1 wherein the distance between the center of said first position and the center of said second position is approximately equal to the diameter of one information disc.

3. An apparatus as defined in claim 1 wherein said means for engaging said information disc lifts said information disc out of said track to said third position which is high enough such that said means for positioning said pneumatic means can move said pneumatic means to another track such that another information disc can be selected and accessed without collision of the previously selected information disc with any underlying structure.

4. The apparatus of claim 1 wherein said means for positioning, said means for triggering, said pneumatic means, said means for engaging and said read-head means cooperate to select multiple information discs for simultaneous read and/or write transactions.

5. The apparatus of claim 4 wherein said means for engaging lifts each selected information disc only enough to clear the track in which said information disc was stored so that said means for positioning can move to select another information disc and access said disc using an unoccupied read-head means without any of the selected discs interfering with any track during said movement.

6. The apparatus of claim 4 wherein said means for positioning said pneumatic means comprises:

a rotating platform at the center of said circular storage magazine;

and wherein said plurality of read-head means are mounted on said rotating platform, and wherein each of said read-head means includes at least one means for engaging a selected information disc, and wherein said read-head means are spaced around the periphery of said rotating platform;

a stepper motor coupled to said rotating platform so as to rotate said platform; and control means coupled to said stepper motor for controlling the position of said rotating platform such that any of said read-head means may be aligned with any track in which a selected information disc is stored.

7. The apparatus of claim 6 wherein said rotating platform has formed therein at least one air channel for each of said read-head means, and wherein each of said read-head means is positioned on said rotating platform adjacent an exit port for said air channel in the edge of said rotating platform, said exit port being part of said air channel in said rotating platform for the adjacent read-head means and forming part of said pneumatic means and through which said pneumatic means blows pressurized air into the air channel of any track with which said exit port is aligned, and wherein said control means includes means for determining the closest read-head means which has not engaged an information disc and for controlling said stepper motor to cause said means for positioning said pneumatic means to position said rotating platform such that said exit port which is closest to the nearest read-head means not engaged with an information disc is aligned with the track in which said information disc to be engaged and picked up by said read-head means is stored such that when said pneumatic means blows air into the air channel of the track containing the selected information disc, said selected information disc is moved from said first position to said second position and is engaged by said read-head means, and wherein said pneumatic means includes a pneumatic pump which is pneumatically coupled to said air channel(s) in said rotating platform, and wherein said control means includes means for controlling said pneumatic pump to pressurize said air channel(s) in said rotating platform after the exit port of the air channel adjacent the read-head means being used to pick up a selected information disc has been aligned with the track storing the selected information disc.

8. The apparatus of claim 7 wherein said control means includes means for controlling said positioning means such that as many information discs as there are read-head means can be engaged and read or write transactions performed therewith, and wherein said means for engaging includes a pair of hub arms each of which has a rotatable hub, said hub arms configured to grasp the central portion of an information disc firmly when said hub arms are pinched together, and wherein at least one of said hub arms has a cam follower which is engaged with a cam surface shaped so as to cause said hub arms to pinch together sufficiently to cause said rotatable hubs to firmly engage the central portion of the information disc, and wherein said hub arms are coupled to an arm-mount which has a threaded opening engaged with a lead screw such that when said lead screw turns, said hub arms are moved either up or down with the movement of said arm-mount along said lead screw, and the spatial relationship between said arm-mount, said hub arms, said lead screw and said cam follower is such that movement of said arm-mount causes said cam surface follower to track along the surface of said cam such that when said hub arms move upward with said arm-mount, said cam follower causes said hub arms to move closer together and to ultimately move sufficiently close together to grasp the central portion of said selected information disc firmly with said rotatable hub, and wherein said read-head means further comprises a hub drive motor coupled to at least one of said rotatable hub for purposes of spinning the information disc so engaged, and wherein said hub drive motor is coupled to said control means, and wherein said control means includes means for controlling said hub drive motor to spin at least one of said rotatable hubs at a speed appropriate for the type of data being read or written, and further comprising a lead screw drive motor coupled to said control means, and wherein said control means includes means for driving said lead screw drive motor under predetermined conditions so as to engage and pick up an information disc.

9. The apparatus of claim 8 wherein one of said hub arms has a photosensor mounted thereon and the other hub arm has a light source mounted thereon so as to shine light on said photosensor when no information disc is located between said hub arms, the positioning of said hub arms and said photosensor and light source relative to said track being such that when an information disc is in said second position, the light beam between said light source and said photosensor is interrupted, and wherein said photosensor is coupled to said control means, and wherein said control means includes means for monitoring a signal from said photosensor to determine when said pneumatic means has pressurized said air channel in the track storing the selected information disc and said selected information disc has moved to said second position, and, when said information disc has reached said second position, for controlling said lead screw drive motor to drive said lead screw in a direction to cause said hub arms to engage said selected information disc located in said second position, and pick said disc up sufficiently to clear the track in which said disc resides.

10. The apparatus of claim 6 wherein said means for positioning said pneumatic means includes means for translating said read-head means to a position adjacent to the location of the track in which said selected information disc is stored, said means for translating including said rotating platform, and wherein said rotating platform includes at least one air channel which can be selectively pressurized, and, when said air channel is pressurized, said air channel in said rotating platform will pressurize any said air channel of any track which has its air channel aligned with said air channel in said rotating platform; and means for selectively pressurizing said air channel in said rotating platform after said rotating platform has been rotated to align the air channel therein with the air channel of a track in which an information disk to be engaged is stored.

11. The apparatus of claim 10 wherein said rotating platform has one air channel for each read-head means, each air channel having an output port located adjacent said read-head means and on an edge of said rotating platform that is selectively positioned adjacent an input port of an air channel of a selected track.

12. The apparatus of claim 1 wherein said pneumatic means includes at least a first port in said air channel of each track located in or near said first position and a second port in said air channel of each track located in or near said second position, such that when an information disc is stored in said first position of a track and the air channel of said track is pressurized, said information disc is caused to roll from said first position to said second position, and if an information disc is stored in said second position of said track when said air channel is pressurized, said information disc is caused to roll from said second position to said first position, and wherein said means for positioning said pneumatic means includes means for selectively pressurizing the air channel of any track storing an information disc which is selected for engagement by said means for engaging.

* * * * *